United States Patent
Kimura

(10) Patent No.: US 7,583,968 B2
(45) Date of Patent: Sep. 1, 2009

(54) RADIO COMMUNICATION APPARATUS FOR FEEDING BACK RADIO LINK QUALITY INFORMATION

(75) Inventor: Dai Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 708 days.

(21) Appl. No.: 10/802,415

(22) Filed: Mar. 17, 2004

(65) Prior Publication Data

US 2005/0053038 A1 Mar. 10, 2005

(30) Foreign Application Priority Data

Sep. 5, 2003 (JP) ............................. 2003-313708

(51) Int. Cl.
H03M 13/00 (2006.01)
H03M 13/35 (2006.01)
H04M 1/00 (2006.01)
H04B 7/185 (2006.01)
H04Q 7/00 (2006.01)
H04L 23/00 (2006.01)

(52) U.S. Cl. ...................... 455/450; 370/318; 370/333; 714/751; 714/755

(58) Field of Classification Search ................ 714/755, 714/751; 455/550; 370/318, 333; 375/377
See application file for complete search history.

(56) References Cited

U.S. PATENT DOCUMENTS

| 7,076,720 | B1 * | 7/2006 | Yoshida et al. ............... 714/755 |
| 7,131,049 | B2 * | 10/2006 | Kim et al. .................... 714/751 |
| 2003/0092464 | A1 * | 5/2003 | Li ............................... 455/550 |
| 2003/0123598 | A1 | 7/2003 | Gollamudi et al. |
| 2003/0137950 | A1 * | 7/2003 | Kim et al. .................... 370/318 |
| 2005/0053038 | A1 * | 3/2005 | Kimura ........................ 370/333 |

FOREIGN PATENT DOCUMENTS

| EP | 1 227 603 A1 | 7/2002 |
| EP | 1 259 015 | 7/2003 |

OTHER PUBLICATIONS

Michiharu Nakamura, et al. Adaptive Control of Link Adaptation for High Speed Downlink Packet Access (HSDPA) in W-CDMA. Oct. 2002, pp. 382-386. IEEE.

Toshiyuki Uehara, et al. A Study of Rate Assignment Scheme of HSDPA Base Station. Mar. 2002. pp. 106-112. IEIICE.

(Continued)

*Primary Examiner*—William D Cumming
(74) *Attorney, Agent, or Firm*—Hanify & King, P.C.

(57) ABSTRACT

A base station has a time correlation calculating unit for estimating a variation-with-time characteristic of radio link quality using radio downlink quality information reported by a mobile station, a target error rate setting unit for changing over a target error rate adaptively using this variation-with-time characteristic, and an MCS decision unit for deciding a modulation scheme and/or encoding rate, in such a manner that packet error rate becomes equal to the target error rate, using the radio link quality information as well as reception success/failure information reported by the mobile station. The base station transmits a packet based upon the modulation scheme and/or encoding rate decided.

10 Claims, 16 Drawing Sheets

OTHER PUBLICATIONS

European search report; Application No. 04251561.9-1237; Reference No. P101176EP00/DNL; dated Oct. 24, 2007, 3 pages.

Fujiwara et al., "Link Adaptation Method Using Fading Frequency for High-Speed Packet Transmission with Adaptive Modulation and Coding Scheme in W-CDMA Mobile Radio", Society Conference 1 of the IEICE, 2000, Japan, and Institute of Electronics, Information and Communication Engineers, Sep. 7, 2000, p. 367, B-5 to 79.

* cited by examiner

| $R_1$ | FADING FREQUENCY [Hz] | TARGET ERROR RATE PER |
|---|---|---|
| 0.98~ | ~ 5 | 0.1 |
| 0.85 ~ 0.98 | 5 ~ 15 | 0.2 |
| 0.50 ~ 0.85 | 15 ~ 30 | 0.3 |
| 0.16 ~ 0.50 | 30 ~ 45 | 0.4 |
| ~ 0.16 | 45 ~ | 0.5 |

FIG. 15 PRIOR ART

| CQI value | TBS | Ncode | Modulation |
|---|---|---|---|
| 1 | 137 | 1 | QPSK |
| 2 | 173 | 1 | QPSK |
| 3 | 233 | 1 | QPSK |
| 4 | 317 | 1 | QPSK |
| 5 | 377 | 1 | QPSK |
| 6 | 461 | 1 | QPSK |
| 7 | 650 | 2 | QPSK |
| 8 | 792 | 2 | QPSK |
| 9 | 931 | 2 | QPSK |
| 10 | 1262 | 3 | QPSK |
| 11 | 1483 | 3 | QPSK |
| 12 | 1742 | 3 | QPSK |
| 13 | 2279 | 4 | QPSK |
| 14 | 2583 | 4 | QPSK |
| 15 | 3319 | 5 | QPSK |
| 16 | 3565 | 5 | 16-QAM |
| 17 | 4189 | 5 | 16-QAM |
| 18 | 4664 | 5 | 16-QAM |
| 19 | 5287 | 5 | 16-QAM |
| 20 | 5887 | 5 | 16-QAM |
| 21 | 6554 | 5 | 16-QAM |
| 22 | 7168 | 5 | 16-QAM |
| 23 | 9719 | 7 | 16-QAM |
| 24 | 11418 | 8 | 16-QAM |
| 25 | 14411 | 10 | 16-QAM |
| 26 | 17300 | 12 | 16-QAM |
| 27 | 21754 | 15 | 16-QAM |
| 28 | 23370 | 15 | 16-QAM |
| 29 | 24222 | 15 | 16-QAM |
| 30 | 25558 | 15 | 16-QAM |

RADIO COMMUNICATION APPARATUS FOR FEEDING BACK RADIO LINK QUALITY INFORMATION

BACKGROUND OF THE INVENTION

This invention relates to a radio communication apparatus and, more particularly, to a radio communication apparatus in a radio packet communication system for feeding back radio link quality information, which has been measured on a packet receiving side, to a transmitting side and adaptively controlling the modulation scheme and/or encoding rate on the transmitting side using the quality information.

In a radio packet communication system that uses adaptive modulation/demodulation and adaptive encoding such as High-Speed Downlink Packet Access (HSDPA) or High Data Rate (HDR), reception quality is measured from an already known downlink pilot symbol and is reported to the base station. On the basis of the reported value, the base station changes the encoding rate and modulation scheme (a combination of encoding rate and modulation scheme shall be referred to below as a modulation and coding scheme, or "MCS") and then transmits the downlink packet, thereby improving throughput. If the MCS increases, the size of the information data transmitted increases but, on the other hand, so does the reception error rate. From the standpoint of throughput that takes retransmission control into consideration, use is made of adaptive MCS that conforms to reception quality. Further, the general practice is to implement ARQ (Automatic Repeat Request) by applying error detection encoding such as a CRC (Cyclic Redundancy Check) to a transmit packet, detecting reception error at the mobile station and feeding back the result to the base station as an ACK (Acknowledge) signal. Further, since the maximum number of data items transmitted simultaneously to a plurality of mobile stations is limited at the base station, a function for allocating transmission opportunity periodically to the transmit data of a specific one or a plurality of mobile stations becomes necessary. This function is referred to as "scheduling".

A prior-art scheme relating to MCS selection involves exercising control in such a manner that the reception error rate of a mobile station is rendered constant. In regard to this prior art, two cases are conceivable, namely one where control is performed by the mobile station [see Michiharu Nakamura, Yassin Awad, Sunil Vadgama, "Adaptive Control of Link Adaptation for High-Speed Downlink Packet Access (HSDPA) in W-CDMA", WPMC'02, October 2002] and one where control is performed by the base station [Toshiyuki Uehara, Makis Kasapidis, Katsuhiko Hiramatsu and Osamu Katoh, "One Study Relating to a Transmission Rate Allocation Method in HSDPA Base Stations", Technical Report of IEICE, SST2001-77, A-P2001-225, RCS2001-260 MoMuC2001-57, MW2001-195 (2002-03)]. In a case where control is performed by the mobile station, error detection is carried out using CRC or the like and control exercised so as to lower the reported reception quality if an error is detected and raise the reported reception quality if an error is not detected, whereby the reception error rate converges to a constant value. In a case where control is performed by the base station, on the other hand, the ACK signal fed back by the mobile station is discriminated and control is exercised so as to enlarge the transmit. MCS (enlarge the data size of the transmit information) in case of ACK and diminish the transmit MCS (reduce the data size of the transmit information) in case of NACK, whereby the reception error rate converges to a constant value. A stabilized packet error rate characteristic is obtained as a result. In addition, by setting a target error rate beforehand so as to maximize throughput, it is possible to stabilize and improve throughput.

FIG. 11 is a block diagram of a conventional radio packet communication system in which a base station adaptively controls a modulation scheme and/or encoding rate based upon a target error rate as well as radio downlink quality information and mobile-station reception success/failure information received from a mobile station.

A mobile station 1 has a receiver 1a for receiving a high-frequency signal sent to it from a radio base station 2, converting the signal to a baseband signal and inputting the baseband signal to a packet receiver 1b and pilot-symbol receiver 1c. The packet receiver 1b demodulates encoded packet data, applies decode processing and inputs the decoded signal to an error detector 1d. The latter performs error detection using an error detecting code (CRC code) contained in the decoded signal and inputs the result of detection to an uplink signal generating unit 1e. Meanwhile, the pilot-symbol receiver 1c extracts a pilot symbol and inputs the symbol to a reception quality measurement unit 1f. The latter measures the SIR (Signal to Interference Ratio) as the reception quality of the radio downlink using a known pilot symbol and the received pilot symbol, converts the measured SIR as indicated by Equation (1) below and inputs the result of the conversion to the uplink signal generating unit 1e as downlink reception quality information [referred to below as "CQI" (Channel Quality Indicator)].

$$CQI = f(SIR) = [10 \times \log_{10}(SIR) + C] \quad (1)$$

where C represents a fixed value given in advance and [X] the largest integer that will not exceed X.

The uplink signal generating unit 1e incorporates ACK/NACK, which is the result of error detection, and the downlink reception quality information CQI in the uplink signal, and a transmitter 1g subjects the uplink signal to modulation processing and frequency conversion and transmits the resultant signal. FIG. 12 illustrates an example of a data format for transmitting ACK/NACK and CQI on an uplink HS-DPCCH channel in 3GPP.

The base station 2 has a receiver 2a for receiving uplink signals from a plurality of mobile stations 1, applying a frequency conversion and demodulation processing to the receive signal and then separating ACK/NACK and CQI from the signal and outputting the same. The base station 2 has a scheduler 2b which, on the basis of the quality information CQI from each mobile station, selects the mobile station to which the next packet is to be transmitted and inputs this information to an MCS decision unit 2c and transmit-data buffer 2d. Conventional examples of schemes for selecting a mobile station that is to be the destination of a transmission include a scheme (Max CIR scheme) for selecting the mobile station that has the best reception quality at that moment, and a scheme (Proportional Fairness scheme) for selecting the mobile station having the largest ratio of momentary reception quality to average reception quality.

Next, using a CQI-MCS conversion table, the MCS decision unit 2c decides the MCS (modulation scheme and encoding rate) of the packet to be transmitted to the mobile station that has been selected by the scheduler 2b. It should be noted that the MCS decision unit 2c decides MCS upon referring to the conversion table after an offset, which is decided by ACK/NACK and the target error rate, is added to the received CQI. The offset decided by ACK/NACK and the target error rate is added on because there is only one conversion table and it is necessary to apply a correction so as to obtain a CQI value that conforms to the communication environment. In this case, if the value of the offset is updated in accordance with Equation (2) below based upon ACK/NACK of the mobile station, the reception quality of mobile station 1 can be made to converge to a target error rate (PER).

$$\begin{cases} \text{Offset} = \text{Offset} + \alpha \text{ if ACK is received} \\ \text{Offset} = \text{Offset} - \beta \text{ if NACK is received} \end{cases} \quad (2)$$

where $\alpha$ and $\beta$ are related as follows: $\alpha/\beta=\text{PER}/(1-\text{PER})$. For example, assume that the target error rate (PER) is $10^{-1}$ and that $\alpha=0.1$, $\beta=0.9$ hold. If the error rate attains the target error rate (PER) in this case, ACK is received nine times out of ten and the offset is increased by a total of 0.9, NACK is received one time out of ten and the offset is decreased by 0.9, and the overall increase/decrease in the offset is zero, whereby convergence to a constant value is achieved. The reception quality CQI converges to a value conforming to the target error rate (PER). The MCS decision unit 2c decides and outputs the MCS corresponding to the CQI that conforms to the communication environment and target error rate.

It should be noted that an offset is retained separately for each mobile station and that offset updating is performed at the timing at which ACK/NACK is received even with regard to mobile stations other than the mobile station that has been selected by scheduling.

If the mobile station that is to transmit information and the MCS (modulation scheme and encoding rate) of each mobile station have thus been decided, the transmit data buffer 2d sends the decided transmit-information data of the mobile station to a transmit packet generator 2e in a size (=TBS) decided by the MCS. The transmit packet generator 2e has the structure shown in FIG. 13. Specifically, a channel encoder 2e-1 encodes the transmit data based upon an encoding rate (=TBS/n) using the transmit-data bit count (=TBS) and transmit-code bit count (=n) decided by the MCS decision unit 2c, and a modulator 2e-2 creates a downlink radio packet by performing digital modulation in accordance with the modulation scheme (QPSK/16-QAM) similarly decided by the MCS decision unit 2c. A transmitter 2f transmits this radio packet and a known pilot, which enters from a pilot generator (not shown).

It should be noted that in the case of CDMA, the downlink radio packet transmitted to each mobile station is spread by a channelization code conforming to the mobile station, after which the packet is combined and input to the transmitter 2f. Further, in a case where the packet is transmitted upon application of frequency multiplexing, the data is converted to frequency data conforming to the mobile station and then the frequency data is multiplexed and transmitted. A case where the transmit-code bit count (=n) is input to the transmit packet generator 2e has been described above. However, it can be so arranged that the encoding rate r is calculated by the MCS decision unit 2c and input to the transmit packet generator 2e.

A radio packet transmitted from the mobile station 2 has been encoded to make error detection possible. The mobile station 1 feeds back an ACK symbol if an error has not been detected and a NACK symbol if an error has been detected. Further, the mobile station 1 measures the SIR based upon the pilot symbol, calculates the CQI and feeds it back to the base station. The prior-art communication system for radio packets achieves high-speed packet communication by repeating the above operation.

FIG. 14 is a block diagram of the MCS decision unit 2c. Specifically, an offset calculating unit 2c-1 calculates the offset for every mobile station according to Equation (2) based upon ACK/NACK, holds the offset and inputs it to a CQI correction unit 2c-2. The latter adds the offset to the reception CQI to thereby correct the CQI. In case of CDMA, a table 2c-3 stores transport block sizes TBS, code counts Ncode and modulation schemes (QPSK/16-QAM) in association with respective ones of CQIs, as shown in FIG. 15, and outputs a TBS, Ncode and modulation scheme that conform to the entered CQI. It should be noted that the smaller the CQI, i.e., the poorer the downlink reception quality, the smaller the transport block size TBS, the smaller the number of codes multiplexed and, moreover, the smaller the number of data items sent by a single modulation operation. As a result, the target error rate can be met even if the reception quality of the radio downlink varies.

A transmit-code bit count calculating unit 2c-4 calculates the transmit-code bit count n, in a manner described below, using Ncode and the modulation scheme, and outputs n. Specifically, since packet length Nchip is such that Nchip=7680 [chips]=0.2 ms holds and spreading factor SF is fixed at SF=16 [chips], the number M of bits that can be transmitted per packet is as follows:

In case of QPSK: Mbit=Nchip/SF×2=960 bits
In case of 16-QAM: Mbit=Nchip/SF×4=1920 bits As a result, the transmit-code bit count n is given by the following:

$$n = M \times N\text{code} \quad (3)$$

The transmit-code bit count calculating unit 2c-4 calculates the transmit-code bit count n in accordance with the above equation and outputs n. By way of example, if CQI=1 holds, then the transmit-code bit count n is equal to 960×1. It should be noted that it is also possible to calculate the encoding rate r in accordance with the following equation:

$$r = TBS/(M \times N\text{code}) \quad (4)$$

and output the encoding rate r instead of the transmit-code bit count n. If CQI=1 holds, then the encoding rate r is equal to 137(960×1)=0.14.

FIG. 16 is a block diagram of another example of a conventional radio packet communication system in which components identical with those shown in FIG. 11 are designated by like reference characters. This example differs in that the mobile station 1 is provided with a reception-quality report value controller 1h. The latter corrects the offset based upon Equation (2) depending upon whether or not an error has been detected, corrects the reception quality information CQI, which enters from the reception quality measurement unit 1f, using the corrected offset, and transmits the corrected CQI and the ACK/NACK information to the base station 2 in accordance with the format of FIG. 12. The base station 2 performs retransmission control using the ACK/NACK information.

FIG. 17 is a timing chart of a radio packet communication system. Here one slot is defined as the reception quality measurement time, CQI transmit/receive time and packet transmit/receive time at the mobile station 1. The time interval from the moment the mobile station 1 measures reception quality at a certain timing and transmits the CQI to the moment the mobile station 1 transmits the CQI next shall be referred to as a CQI feedback cycle Tcycle. Further, the time interval from the moment the mobile station 1 measures reception quality to the moment a packet that reflects the result of measurement is actually received shall be referred to as the CQI delay time. The shortest CQI delay time shall be referred to as minimum CQI delay time Tmin, and the longest CQI delay time shall be referred to as maximum CQI delay time Tmax. In the timing chart of FIG. 17, the interval from reception quality measurement #0 to reception quality measurement #1 is Tcycle (=6 slots), the interval from reception quality measurement #0 to packet reception #00 is Tmin (=3 slots), and the interval from reception quality measurement #0 to packet reception #05 is Tmax (=8 slots). These values are values given beforehand from a higher order layer.

The target error rate that maximizes throughput differs depending upon the status of the mobile station. For example, the optimum target error rate in a case where throughput has been optimized under conditions where reception quality does not fluctuate from the moment the mobile station measures reception quality to the moment a packet is actually received differs greatly from a case where throughput has been optimized under conditions where reception quality fluctuates significantly owing to high-speed travel of the mobile station or a reception-quality reporting period that is too long. In the prior art, therefore, a problem which arises is that throughput declines under conditions where a target error rate set in advance is not always the optimum target error rate. For example, the prior art is such that if the fading frequency rises, errors increase and the offset becomes negative in accordance with Equation (2). As a result, the CQI for satisfying the target error rate decreases. This leads to a decrease in transmit data quantity and a decline in throughput.

SUMMARY OF THE INVENTION

Accordingly, an object of the present invention is to prevent a decline in throughput even under conditions where reception quality fluctuates widely owing to high-speed travel of a mobile station or a reception-quality reporting period that is too long.

Another object of the present invention is to prevent a decline in throughput by varying the target error rate in dependence upon the state of communication of a mobile station.

According to the present invention, the foregoing object is attained by providing a radio communication apparatus in a radio packet communication system for feeding back radio link quality information, which has been measured on a packet receiving side, to a transmitting side and adaptively controlling a modulation-scheme and/or encoding rate on the transmitting side using the quality information.

According to a first aspect of the present invention, the radio communication apparatus comprises means for estimating a variation-with-time characteristic of the radio link quality using the radio link quality information reported by the packet receiving side; means for adaptively changing over a target error rate using the variation-with-time characteristic; means for deciding a modulation scheme and/or encoding rate, in such a manner that packet error rate becomes equal to the target error rate, using the radio link quality information as well as reception success/failure information reported by the packet receiving side; and means for transmitting a packet based upon the modulation scheme and/or encoding rate decided.

According to a second aspect of the present invention, the radio communication apparatus comprises means for estimating a variation-with-time characteristic of the radio link quality using a pilot symbol received from the packet receiving side; means for adaptively changing over a target error rate using the variation-with-time characteristic; means for deciding a modulation scheme and/or encoding rate, in such a manner that packet error rate becomes equal to the target error rate, using the radio link quality information as well as reception success/failure information reported by the packet receiving side; and means for transmitting a packet based upon the modulation scheme and/or encoding rate decided.

In the first and second aspects of the present invention, the means for adaptively changing over the target error rate has a correspondence table indicating correspondence between the variation-with-time characteristic and target error rate, wherein the target error rate is changed over adaptively based upon the variation-with-time characteristic using the table. Further, in the first and second aspects of the present invention, the deciding means tabulates data related to modulation scheme and/or encoding rate in correspondence with the radio link quality information, corrects the radio link quality information by increasing or decreasing it based upon reception success/failure by an amount that conforms to the target error rate, and obtains data related to modulation scheme and/or encoding rate conforming to the radio link quality information after the correction thereof.

According to a third aspect of the present invention, the radio communication apparatus comprises means for estimating throughput on the packet receiving side; means for adaptively controlling a target error rate so as to maximize the throughput; means for deciding a modulation scheme and/or encoding rate, in such a manner that packet error rate becomes equal to the target error rate, using the radio link quality information as well as reception success/failure information reported by the packet receiving side; and means for transmitting a packet based upon the modulation scheme and/or encoding rate decided.

According to a fourth aspect of the present invention, the radio communication apparatus comprises means for estimating a variation-with-time characteristic of the radio link quality using a pilot symbol received from the packet transmitting side; means for adaptively changing over a target error rate using the variation-with-time characteristic; means for receiving a radio packet, which has undergone error detection and encoding, and performing error detection; means for measuring a radio link quality value using the pilot symbol received; means for correcting the radio link quality value using result of error detection in such a manner that error rate of the pilot becomes equal to the target error rate; and means for reporting the corrected radio link quality value to a packet transmitting side.

In the fourth aspect of the present invention, the means for adaptively changing over the target error rate has a correspondence table indicating correspondence between the variation-with-time characteristic and target error rate, wherein the target error rate is changed over adaptively based upon the variation-with-time characteristic using the table.

According to a fifth aspect of the present invention, the radio communication apparatus comprises means for measuring throughput of a received radio packet; means for adaptively controlling a target error rate so as to maximize the throughput; means for receiving a radio packet, which has undergone error detection and encoding, and performing error detection; means for measuring radio link quality value; means for correcting the radio link quality value using result of error detection in such a manner that packet error rate becomes equal to the target error rate; and means for reporting the corrected radio link quality value to a packet transmitting side.

In the fourth and fifth aspects of the present invention, the transmitting side has means for deciding a modulation scheme and/or encoding rate using the radio link quality value reported, and means for transmitting a packet based upon the modulation scheme and/or encoding rate decided.

In accordance with the present invention, it is possible to prevent a decline in throughput, by varying the target error rate, even under conditions where reception quality fluctuates widely owing to high-speed travel of a mobile station or a reception-quality reporting period that is too long. That is, in accordance with the present invention, a variation-with-time characteristic of reception quality from the moment a mobile station measures reception quality to the moment a packet is actually received is estimated, and the target error rate is changed over adaptively based upon the variation-with-time characteristic in such a manner that throughput is maximized. As a result, a decline in throughput can be prevented.

In accordance with the present invention, a small target error rate is set if the variation in reception quality is small and a large target error rate is set if the variation in reception quality is large, whereby the target error rate is changed over adaptively. The reason for this is that if the target error rate is enlarged when the variation in reception quality is large, then, even though the error rate may deteriorate somewhat, it becomes possible to enlarge the size of the transmit data correspondingly and, hence, throughput can be improved. It should be noted that since recovery from a degraded packet error rate can be achieved by retransmission control, such degradation is not a major problem. This means that in a case where a plurality of mobile stations that travel at various speeds are present in a radio cell, a major improvement in throughput is achieved in comparison with the prior art.

Other features and advantages of the present invention will be apparent from the following description taken in conjunction with the accompanying drawings.

BRIEF DESCRIPTION OF THE DRAWINGS

FIG. 15 is a CQI-MCS conversion table according to the prior art;

Figure 1:
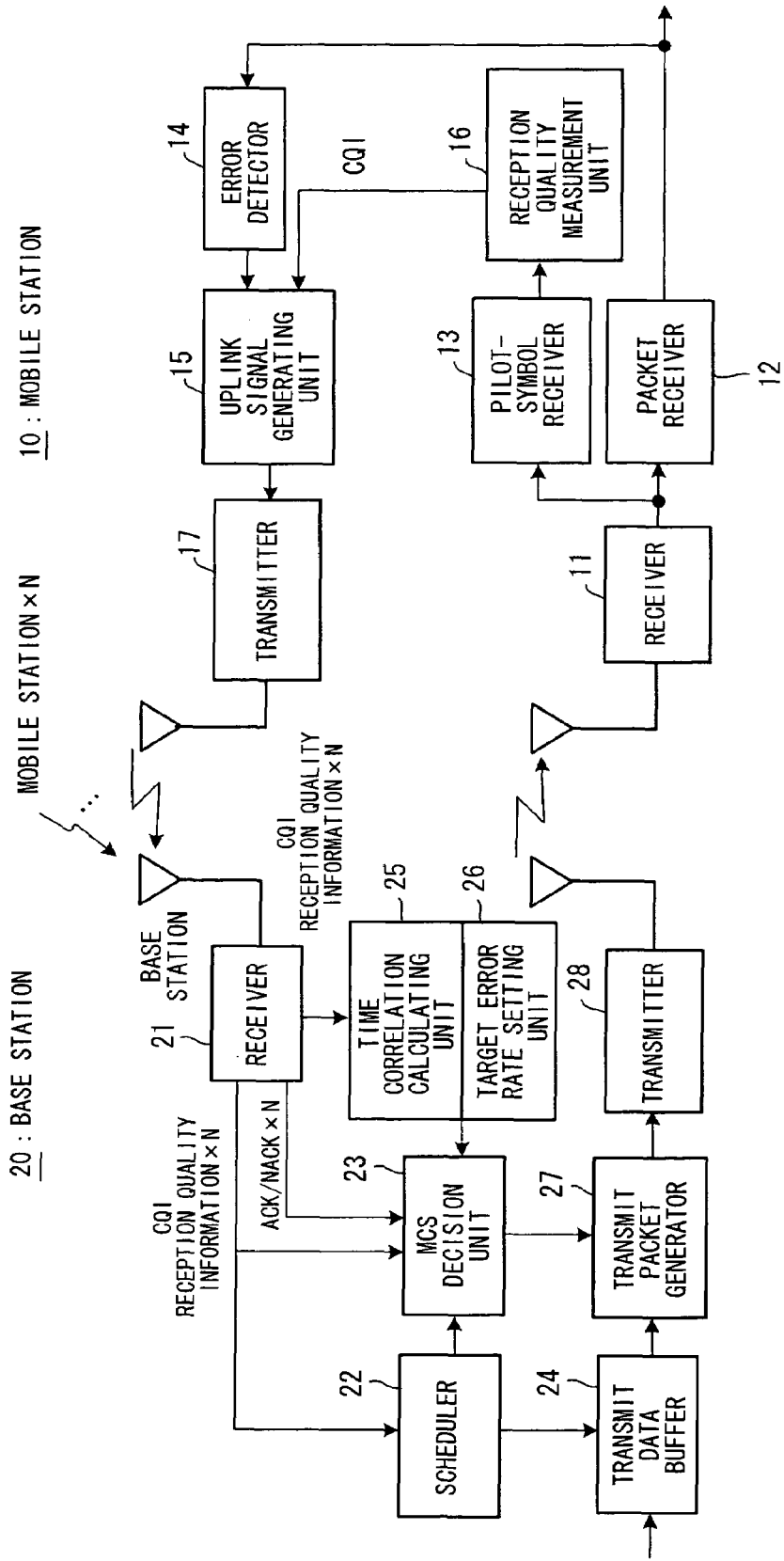
FIG. 1 is a block diagram illustrating the configuration of a radio packet communication system according to a first embodiment of the present invention.

DESCRIPTION OF THE PREFERRED EMBODIMENTS (A) Overview of the present invention

A first radio communication apparatus according to the present invention estimates a variation-with-time characteristic of radio link quality using radio link quality information reported by a packet receiving side, changes over a target error rate adaptively using the variation-with-time characteristic, decides a modulation scheme and/or encoding rate, in such a manner that packet error rate becomes equal to the target error rate, using the radio link quality information as well as reception success/failure information reported by the packet receiving side, and transmits a packet based upon the modulation scheme and/or encoding rate decided.

A second radio communication apparatus according to the present invention estimates a variation-with-time characteristic of radio link quality using a pilot symbol received from a packet receiving side; changes over a target error rate adaptively using the variation-with-time characteristic, decides a modulation scheme and/or encoding rate, in such a manner that packet error rate becomes equal to the target error rate, using the radio link quality information as well as reception success/failure information reported by the packet receiving side, and transmits a packet based upon the modulation scheme and/or encoding rate decided.

A third radio communication apparatus according to the present invention estimates throughput on a packet receiving side, controls a target error rate adaptively so as to maximize the throughput, decides a modulation scheme and/or encoding rate, in such a manner that packet error rate becomes equal to the target error rate, using the radio link quality information as well as reception success/failure information reported by the packet receiving side, and transmits a packet based upon the modulation scheme and/or encoding rate decided.

A fourth radio communication apparatus according to the present invention estimates a variation-with-time characteristic of radio link quality using a pilot symbol received from a packet transmitting side and changes over a target error rate adaptively using the variation-with-time characteristic. Further, the apparatus receives a radio packet, which has undergone error detection and encoding, performs error detection, measures a radio link quality value using the pilot symbol received, corrects the radio link quality value using result of error detection in such a manner that error rate of the pilot becomes equal to the target error rate, and reports the corrected radio link quality value to a packet transmitting side. Furthermore, the transmitting side decides the modulation scheme and/or encoding rate using the radio link quality value reported and transmits a packet based upon the modulation scheme and/or encoding rate decided.

A fifth radio communication apparatus according to the present invention measures throughput of a received radio packet and controls a target error rate adaptively so as to maximize the throughput. Further, the apparatus receives a radio packet, which has undergone error detection and encoding, performs error detection and measures radio link quality.

Further, the apparatus corrects the radio link quality value using result of error detection in such a manner that error rate of the pilot becomes equal to the target error rate, and reports the corrected radio link quality value to a packet transmitting side. Furthermore, the transmitting side decides the modulation scheme and/or encoding rate using the radio link quality value reported and transmits a packet based upon the modulation scheme and/or encoding rate decided.

In accordance with the first to fifth embodiments, throughput can be improved by varying the target error rate in dependence upon the communication status of a mobile station.

(B) First Embodiment

FIG. 1 is a block diagram illustrating the configuration of a radio packet communication system according to a first embodiment of the present invention.

As shown in FIG. 1, a mobile station 10 has a receiver 11 for receiving a high-frequency signal sent to it from a radio base station 20, converting the signal to a baseband signal and inputting the baseband signal to a packet receiver 12 and pilot-symbol receiver 13. The packet receiver 12 demodulates encoded packet data, applies decode processing and inputs the decoded signal to an error detector 14. The latter performs error detection using an error detecting code (CRC code) contained in the decoded signal and inputs the result of detection to an uplink signal generating unit 15. Meanwhile, the pilot-symbol receiver 13 extracts a pilot symbol and inputs the symbol to a reception quality measurement unit 16. The latter measures the SIR (Signal to Interference Ratio) as the reception quality of the radio downlink using a known pilot symbol and the received pilot symbol, calculates downlink reception quality information CQI (Channel Quality Indicator) using Equation (1) and inputs CQI to the uplink signal generating unit 15.

The uplink signal generating unit 15 incorporates ACK/NACK, which is the result of error detection, and the downlink reception quality information CQI in the uplink signal, and a transmitter 17 subjects the uplink signal to modulation processing and frequency conversion and transmits the resultant signal.

The base station 20 has a receiver 21 for receiving uplink signals from a plurality of mobile stations 10, applying a frequency conversion and demodulation processing to the receive signal and then separating ACK/NACK and CQI from the signal and outputting the same. The base station 20 has a scheduler 22 which, on the basis of the quality information CQI from each mobile station, selects the mobile station to which the next packet is to be transmitted and inputs this to an MCS decision unit 23 and transmit-data buffer 24.

A time correlation calculating unit 25 obtains a time correlation value $R_1$ of the downlink reception quality information in accordance with the following equation:

$$R_1 = \frac{\langle f^{-1}(CQI_{n+m}) \times f^{-1}(CQI_n) \rangle - \langle f^{-1}(CQI_n) \rangle^2}{\langle f^{-1}(CQI_n)^2 \rangle - \langle f^{-1}(CQI_n) \rangle^2} \quad (5)$$

and inputs the value $R_1$ to a target error rate setting unit 26. Here the subscript of CQI represents the slot timing at which reception is performed by the base station. Further, $f^{-1}(X)$ represents the inverse function of the conversion function [Equation (1)] used by the mobile station, and $f^{-1}(CQI)=SIR$ holds. Further, <X> represents the average of X over time. Furthermore, m represents the slot interval of the downlink reception quality information for obtaining the time correlation value.

Figure 2:
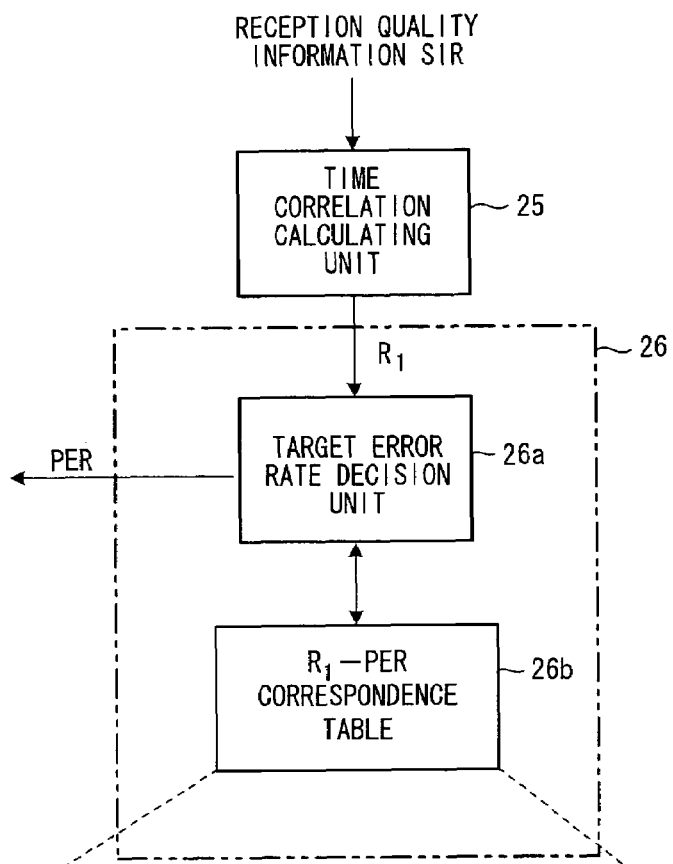
FIG. 2 is a diagram illustrating a target error rate setting unit according to the first embodiment.

The target error rate setting unit 26, which has a correspondence table indicating the correspondence between the time correlation value $R_1$ and target error rate PER, decides the target error rate PER that corresponds to the time correlation value $R_1$ calculated using the table and inputs PER to the MCS decision unit 23. FIG. 2 is a diagram illustrating the structure of the target error rate setting unit 26. As shown in FIG. 2, the target error rate setting unit 26 includes a target error rate decision unit 26a and an $R_1$-PER correspondence table 26b. From the correspondence table the target error rate decision unit 26a obtains the target error rate PER that corresponds to time correlation value $R_1$ and inputs PER to the MCS decision unit 23. The $R_1$-PER correspondence table 26b is created in the manner set forth below.

When fading frequency $f_D$ increases, errors increase, the offset takes on a negative value in accordance with Equation (2) and CQI for meeting the target error rate diminishes. As a result, the transmit data quantity decreases, as should be obvious from the table of FIG. 15, and throughput declines. In order to raise throughput, therefore, it will suffice to decide the $R_1$-PER correspondence table 26b in such a manner that the target error rate PER is increased so that CQI will not decline even if errors increase. In other words, the $R_1$-PER correspondence table 26b is decided so as to enlarge the target error rate PER as the time correlation value $R_1$ a decreases. If the table 26b is created in this manner, the target error rate PER can be decided adaptively in accordance with the value of the time correlation value $R_1$ so as to maximize throughput. It should be noted that although fading frequency (Hz) is included in the $R_1$-PER correspondence table 26b, it has no relation to the first embodiment but is used in an embodiment that follows later.

Figure 14:
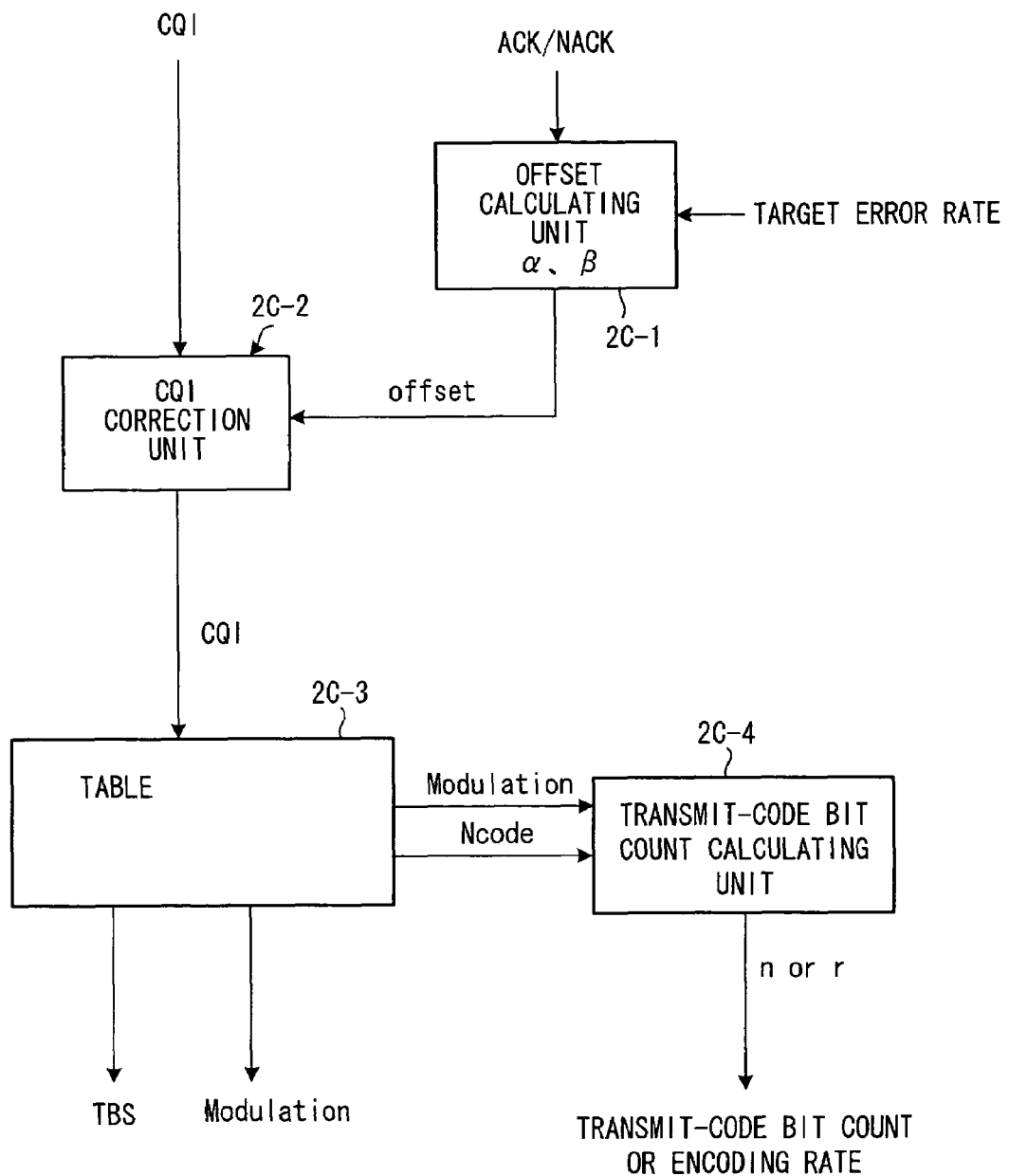
FIG. 14 is a block diagram of an MCS decision unit according to the prior art.
Figure 16:
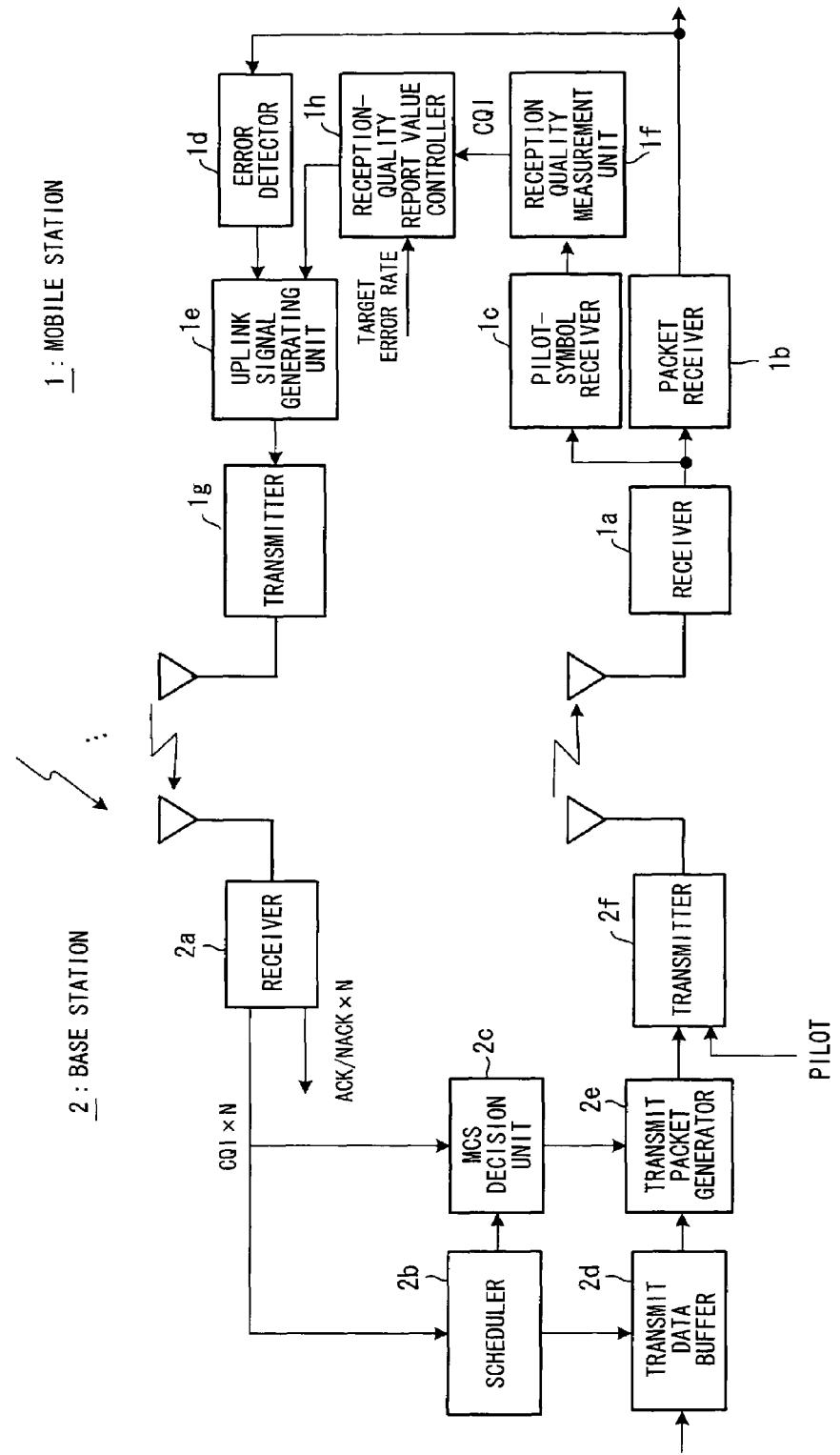
FIG. 16 is a block diagram of another example of a radio packet communication system according to the prior art.

The MCS decision unit 23, which has a structure identical with that of the FIG. 14, uses the CQI-MCS conversion table to decide the MCS (modulation scheme and encoding rate) for every mobile station selected by the scheduler 22 and inputs MCS to a transmit packet generator 27. More specifically, the MCS decision unit 23 decides α, β based on the target error rate PER on a per-mobile-station basis, calculates an offset in accordance with Equation (2) based upon ACK/NACK, corrects CQI by adding the offset to the received CQI, and obtains and outputs the transport block size TBS, code count Ncode and modulation scheme (QPSK/16-QAM), which correspond to the corrected CQI, from the conversion table. Further, the MCS decision unit 23 calculates and outputs the transmit-code bit count n in accordance with Equation (3) using Ncode and the modulation scheme. It should be noted that it is also possible to calculate the encoding rate r in accordance with Equation (4) and output the encoding rate r instead of the transmit-code bit count n.

Figure 13:
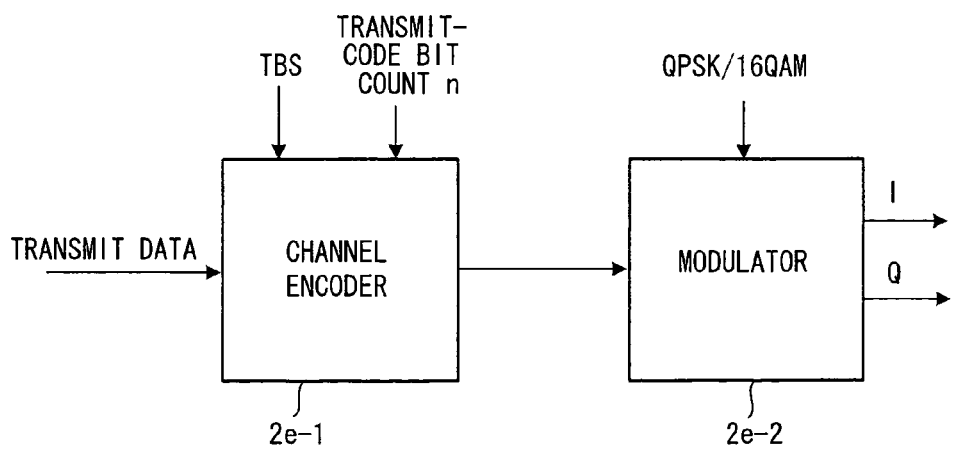
FIG. 13 is a block diagram of a transmit packet generator according to the prior art.

If the mobile station that is to transmit information and the MCS (modulation scheme and encoding rate) of each mobile station have thus been decided, the transmit data buffer 24 sends the transmit-information data of the mobile station to a transmit packet generator 27 in a size (=TBS) decided by the MCS. The transmit packet generator 27, which has the structure shown in FIG. 13, encodes the transmit data based upon an encoding rate (=TBS/n) using the transmit-data bit count (=TBS) and transmit-code bit count (=n) decided by the MCS decision unit 23, and creates a downlink radio packet by performing digital modulation in accordance with the modulation scheme (QPSK/16-QAM) similarly decided by the MCS decision unit 23. A transmitter 28 transmits this radio packet and a known pilot, which enters from a pilot generator (not shown).

The first embodiment has been described with regard to a case where the transmit-code bit count (=n) is input to the transmit packet generator 27. However, it can be so arranged that the encoding rate r is calculated by the MCS decision unit 23 and input to the transmit packet generator 27. Further, the first embodiment illustrates a case where the packet transmitting side is a radio base station and the packet receiving side is a radio mobile station.

However, the invention can also be applied to uplink packet communication. It should be noted that these points also apply to the embodiments that follow.

In accordance with the first embodiment, a variation-with-time characteristic of reception quality from the moment a mobile station measures reception quality to the moment a packet is actually received thereby is estimated, and the target error rate is changed over adaptively based upon the variation-with-time characteristic in such a manner that throughput is maximized. As a result, a decline in throughput can be prevented.

(C) Second Embodiment

Figure 3:
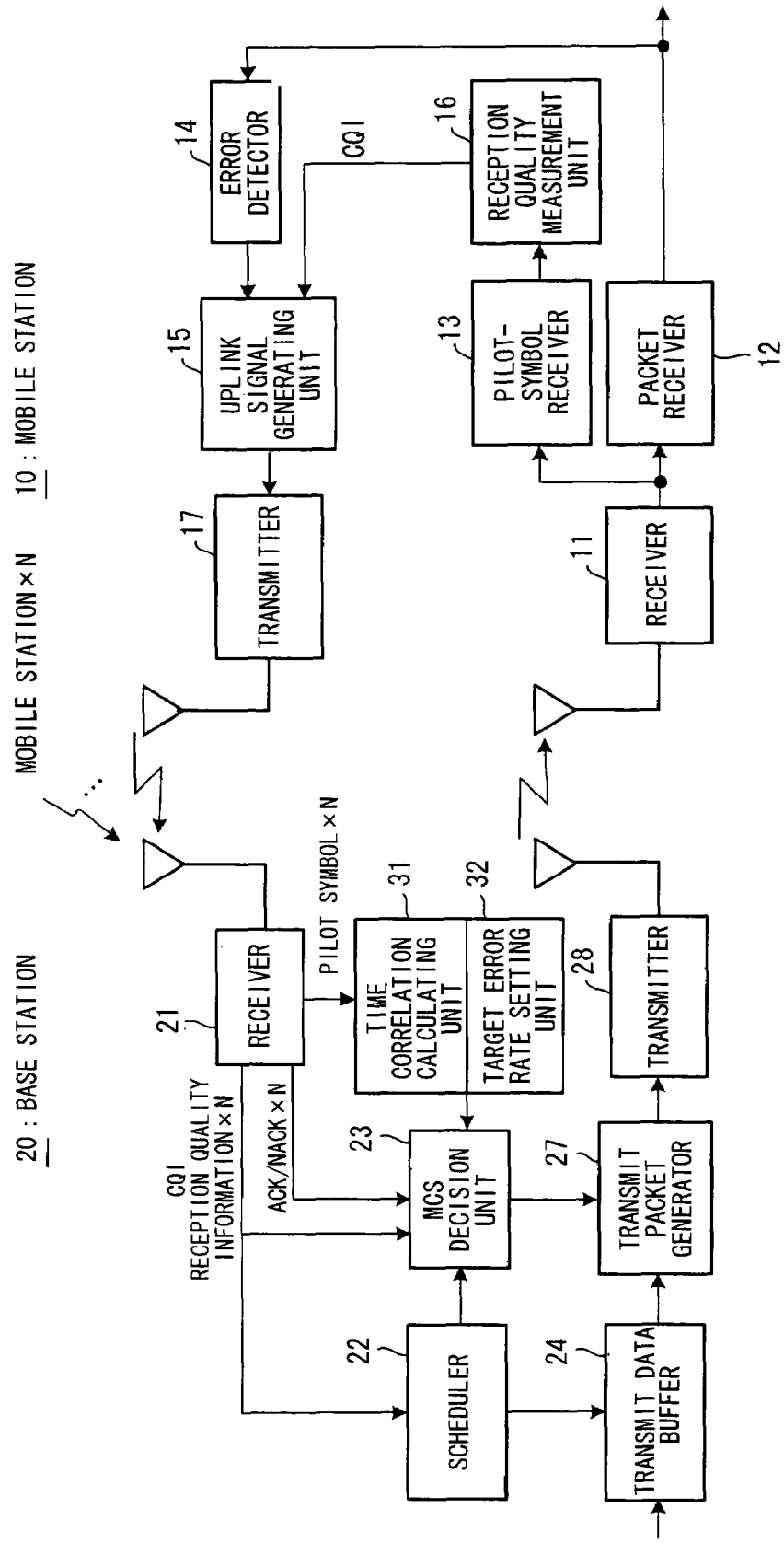
FIG. 3 is a block diagram illustrating the configuration of a radio packet communication system according to a second embodiment of the present invention.

FIG. 3 is a block diagram illustrating the configuration of a radio packet communication system according to a second embodiment of the present invention, in which components identical with those of the first embodiment are designated by like reference characters. This embodiment differs only in the method of calculating the time correlation and the method of setting the target error rate and is the same as the first embodiment in other respects.

A time correlation calculating unit 31 obtains a time correlation value $R_2$ of the downlink reception quality information in accordance with the following equation:

$$R_2 = \frac{\langle \mathrm{Re}[s(t+\tau)^* s(t)] \rangle}{\langle |s(t)|^2 \rangle} \quad (6)$$

and inputs the value $R_2$ to a target error rate setting unit 32. In Equation (6), s(t) represents a complex uplink pilot symbol that prevails after pilot pattern cancellation, t a time interval at which the time correlation is acquired, Re[ ] a function for taking the real part of a complex signal, and <X> the average of X over time.

Figure 4:
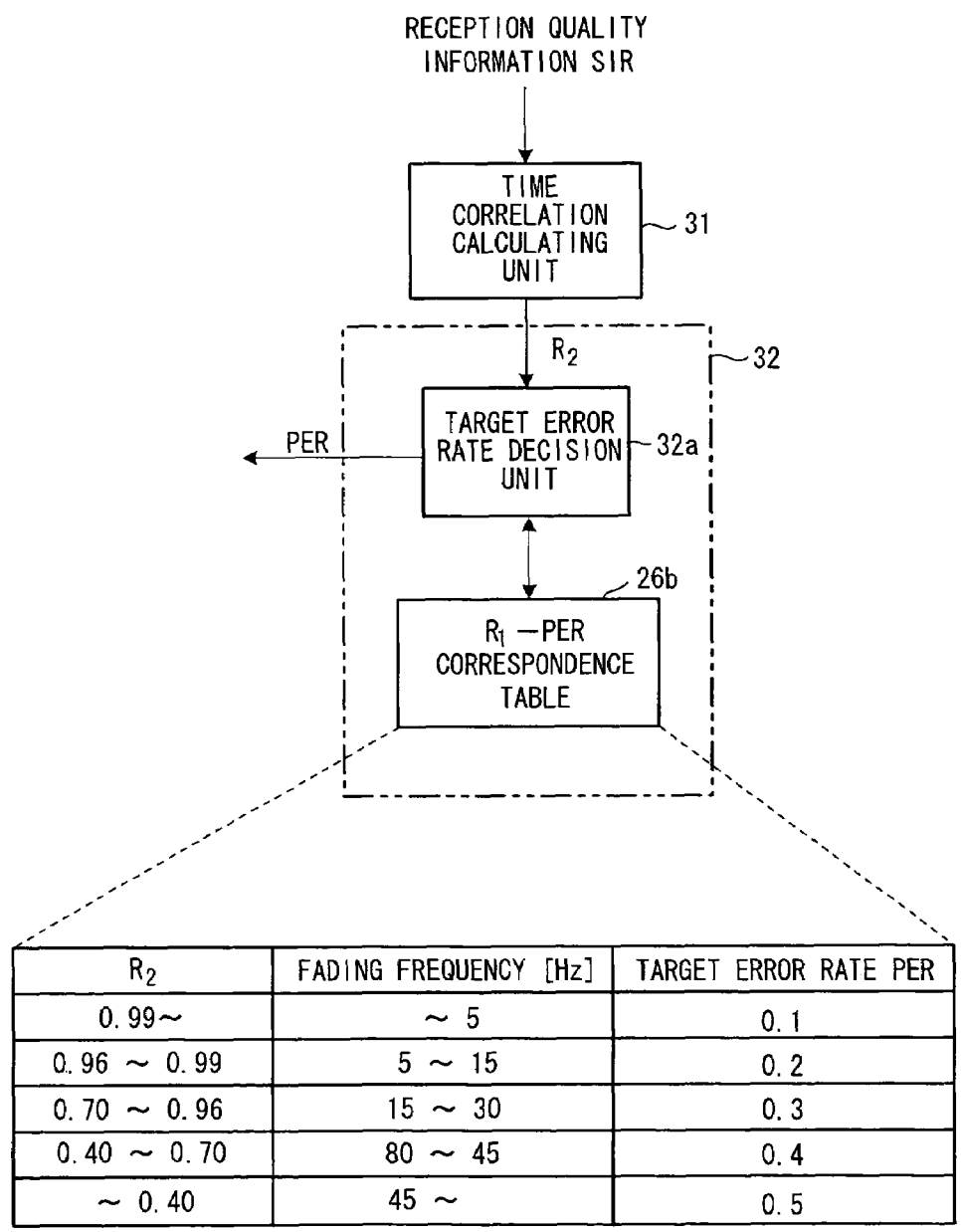
FIG. 4 is a diagram illustrating a target error rate setting unit according to the second embodiment.

The target error rate setting unit 32, which has a correspondence table indicating the correspondence between the time correlation value $R_2$ and target error rate PER, decides the target error rate PER that corresponds to the calculated time correlation value $R_2$ using the table and inputs PER to the MCS decision unit 23. FIG. 4 is a diagram illustrating the structure of the target error rate setting unit 32. As shown in FIG. 4, the target error rate setting unit 32 includes a target error rate decision unit 32a and an $R_2$-PER correspondence table 32b. From the correspondence table the target error rate decision unit 32a obtains the target error rate PER that corresponds to time correlation value $R_2$ and inputs PER to the MCS decision unit 23. The $R_1$-PER correspondence table 32b is created through an approach similar to that of the first embodiment. Specifically, the $R_2$-PER correspondence table 32b is decided so as to enlarge the target error rate PER as the time correlation value $R_2$ a decreases. If the table 32b is created in this manner, the target error rate PER can be decided adaptively in accordance with the value of the time correlation value $R_2$ so as to maximize throughput. It should be noted that although fading frequency (Hz) is included in the $R_2$-PER correspondence table 32b, it has no relation to the second embodiment but is used in an embodiment that follows later.

Thereafter, in a manner similar to that of the first embodiment, the MCS decision unit 23 inputs the transport block size TBS, the modulation scheme (QPSK/16-QAM) and the transmit-code bit count n or the encoding rate r to the transmit packet generator 27. The latter performs encoding based upon the encoding rate r (=TBS/n) and creates a downlink radio packet by performing digital modulation in accordance with the modulation scheme (QPSK/16-QAM), and the transmitter 28 transmits this radio packet and a known pilot, which enters from a pilot generator (not shown).

In case of FDD where the uplink and downlink frequencies differ from each other, the uplink fading environment differs from the downlink fading environment. However, the variation-with-time characteristic on the uplink does not change much from the variation-with-time characteristic on the downlink and the two are considered to be statistically equal. In other words, the uplink reception quality variation characteristic is considered to have a high degree of correlation with the downlink reception quality variation characteristic. In the second embodiment, therefore, the time correlation of the radio downlink is estimated using the uplink pilot symbol to obtain results similar to those of the first embodiment. In the event that there is a large difference between uplink and downlink frequencies, the table would be created taking this difference into consideration.

(D) Third Embodiment

Figure 5:
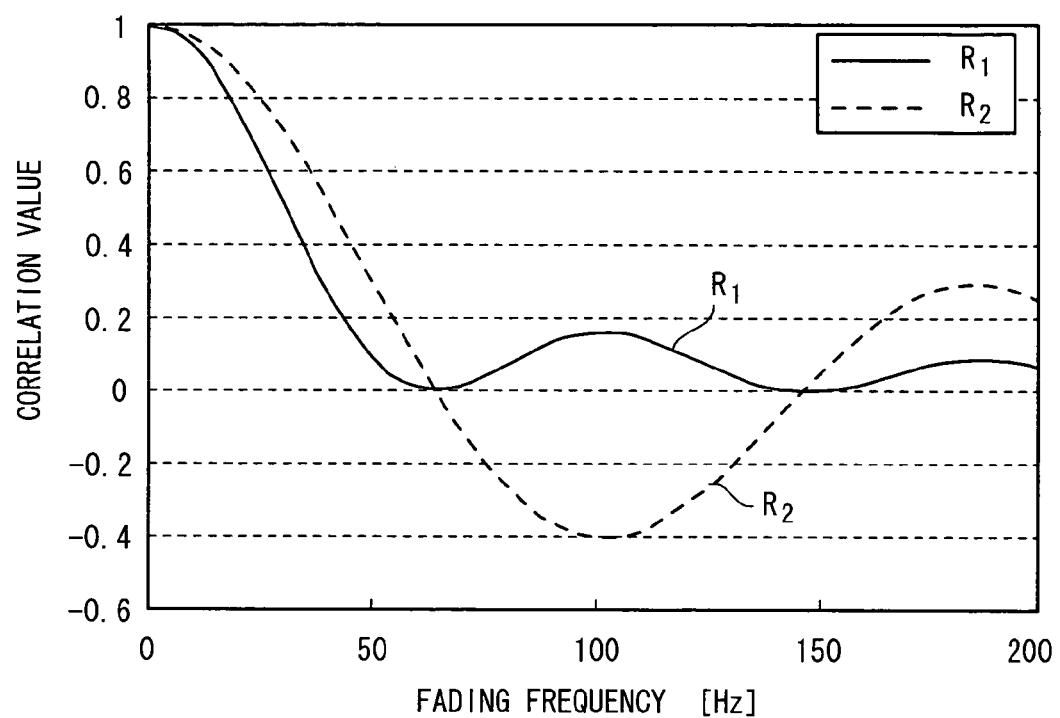
FIG. 5 is a graph showing curves illustrating the relationship between time correlation values and fading frequency.

In radio communication, signals from a transmitter are reflected, diffracted and scattered by objects in the vicinity of the receiver, resulting in a multiplexed propagation path. A large number of waves that arrive at the vicinity of the receiver from various directions interfere with one another so that a random standing-wave electromagnetic distribution is formed. When a mobile station travels through such an electromagnetic distribution, a phenomenon referred to as fading, in which the amplitude and phase of received waves fluctuate randomly, occurs. In an ideal fading environment, the time correlation values $R_1$, $R_2$ in Equations (5), (6) and the fading frequency $f_D$ decided by the travelling speed of the mobile station are related as indicated by the following Equations (7), (8), respectively:

$$R_1 = \{J_0(2\pi f_D \tau)\}^2 \quad (7)$$

$$R_2 = J_0(2\pi f_D \tau) \quad (8)$$

where $f_D$ represents the fading frequency [Hz], $\tau$ the time interval of the correlation, and $J_0(X)$ a Bessel function of degree 0. Accordingly, on the assumption of an ideal fading environment, the fading frequency $f_D$ can be obtained from the time correlation values $R_1$, $R_2$. FIG. 5 is a graph showing curves illustrating the relationship between the time correlation values $R_1$, $R_2$ and fading frequency $f_D$ in a case where $\tau=6$ ms holds. The time correlation values $R_1$, $R_2$ decrease monotonously in dependence upon the fading frequency $f_D$ until $f_D$ reaches 50 Hz. The fading frequencies $f_D$ indicated in the tables of FIGS. 2 and 4 are values calculated in accordance with Equations (7) and (8).

Figure 17:
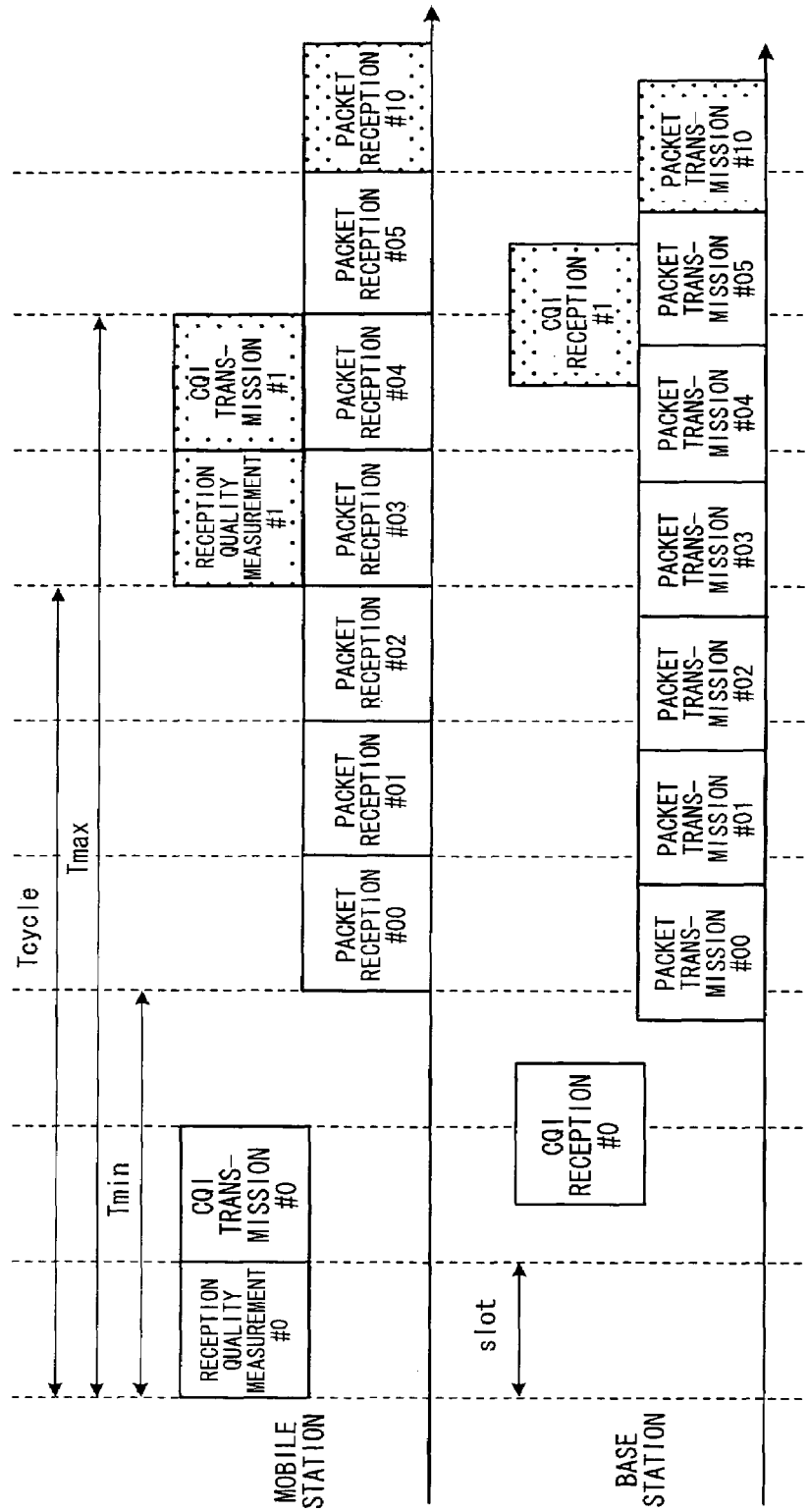
FIG. 17 is a timing chart of a radio packet communication system according to the prior art.

The first and second embodiments relate to a case where the target error rate PER is decided adaptively from the time correlation characteristics $R_1$, $R_2$ when the CQI feedback interval is held constant. However, the period at which the radio link quality information CQI is fed back to the transmitting side differs depending upon the mobile station. In such case the relationships between the time correlation characteristics $R_1$, $R_2$ and the fading frequency $f_D$ deviate from those shown in FIGS. 2 and 4. Since the relationship between the product of the fading frequency $f_D$ and CQI delay interval and the target error rate PER is invariable, the relationships between the time correlation characteristics $R_1$, $R_2$ and the target error rate PER deviate from those shown in FIGS. 2 and 4. Here the CQI delay interval is defined as the time interval between measurement of reception quality and receipt of a packet (see FIG. 17).

In view of the foregoing, it is necessary to decide the target error rate so as to accommodate a disparity in the period at which CQI is fed back to the transmitting side, i.e., a disparity in the CQI delay interval.

Figure 6:
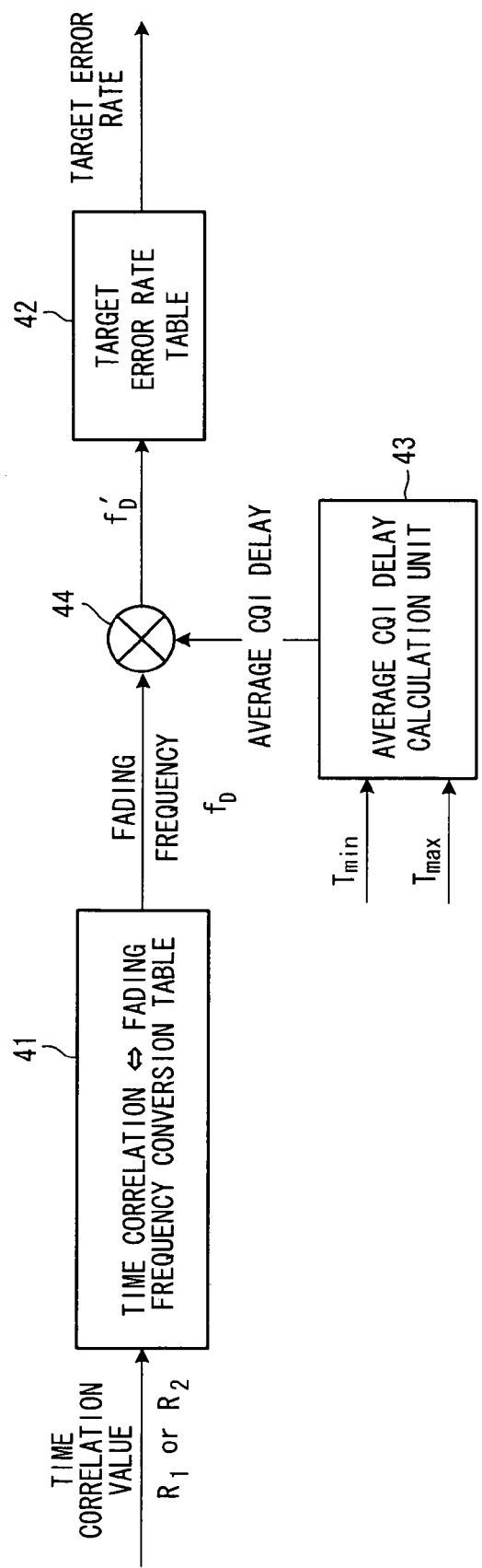
FIG. 6 is a block diagram illustrating a target error rate setting unit according to a third embodiment, in which a disparity in CQI feedback period is accommodated.

FIG. 6 is a block diagram illustrating a target error rate setting unit according to a third embodiment, in which a disparity in CQI feedback period is accommodated. This target error rate setting unit can be used instead of the target error rate setting units 26, 32 of the first and second embodiments, respectively.

A first conversion table 41 converts the time correlation characteristic $R_1$ or $R_2$ to the fading frequency $f_D$ in a case where the time interval at which the correlation value is calculated is made a constant value (6 ms in this case). The table 41 stores the corresponding relationship between the time correlation characteristic $R_1$ or $R_2$ and fading frequency $f_D$ [the corresponding relationship based upon Equations (7), (8)]. A second conversion table 42 converts a variation-with-time coefficient (correction fading frequency) $f_D'$, which is obtained by multiplying the fading frequency $f_D$ by average CQI delay time, to the target error rate PER. The table 42 is created based upon the relationship between the fading frequency $f_D$ and target error rate PER shown in FIG. 2 or 4. An average CQI delay calculation unit 43 outputs the average value of minimum CQI delay time Tmin (see FIG. 17) and maximum CQI delay time Tmax as the average CQI delay time, and a multiplier 44 multiplies the fading frequency $f_D$ by the average CQI delay time and divides the product by the time interval at which the correlation value is calculated. The resultant signal is output as the variation-with-time coefficient $f_D'$.

The target error rate PER setting unit according to the third embodiment decides the fading frequency $f_D$ using the first conversion table 41 created from the time correlation characteristic $R_1$ or $R_2$ using Equation (7) or (8), multiplies the fading frequency by the average CQI delay time and divides the product by the time interval at which the correlation value is calculated, thereby to obtain the variation-with-time coefficient $f_D'$. The setting unit then decides the target error rate PER using the variation-with-time coefficient $f_D'$ obtained and the predetermined second conversion table 42.

In accordance with the third embodiment, the fading frequency $f_D$ is corrected by multiplying it by the average CQI delay time, which is the average value of the minimum CQI delay time Tmin and maximum CQI delay time Tmax, and the target error rate PER is found from the corrected fading frequency. As a result, the target error rate PER can be decided upon taking into account a disparity in the CQI feedback period and the time interval at which the correlation value is calculated.

(E) Fourth Embodiment

Figure 7:
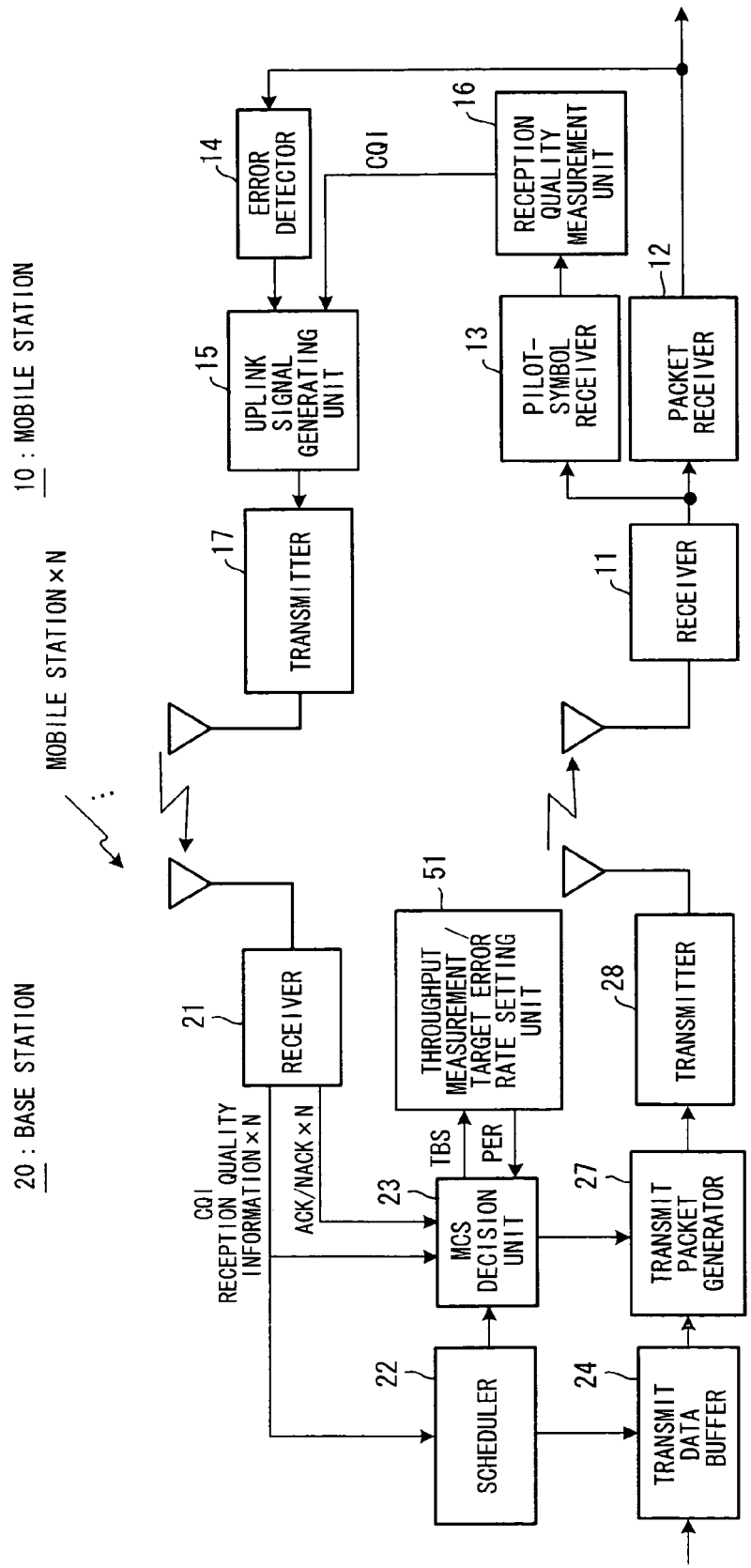
FIG. 7 is a block diagram illustrating the configuration of a radio packet communication system according to a fourth embodiment of the present invention.

FIG. 7 is a block diagram illustrating the configuration of a radio packet communication system according to a fourth embodiment of the present invention, in which components identical with those of the first embodiment are designated by like reference characters. This embodiment differs in that a throughput measurement/target error rate setting unit 51 instead of the time correlation calculating unit 25 and target error rate setting unit 26.

In the fourth embodiment, the throughput measurement/target error rate setting unit 51 measures the throughput of each mobile station 10 and decides the target error rate PER by increasing the target error rate if throughput rises and decreasing the target error rate if throughput falls. In a manner similar to that of the first embodiment, the MCS decision unit 23 thenceforth inputs the transport block size TBS, the modulation scheme (QPSK/16-QAM) and the transmit-code bit count n or the encoding rate r to the transmit packet generator 27. The latter performs encoding based upon the encoding rate r (=TBS/n) and creates a downlink radio packet by performing digital modulation in accordance with the modulation scheme (QPSK/16-QAM), and the transmitter 28 transmits this radio packet and a known pilot, which enters from a pilot generator (not shown).

Figure 8:
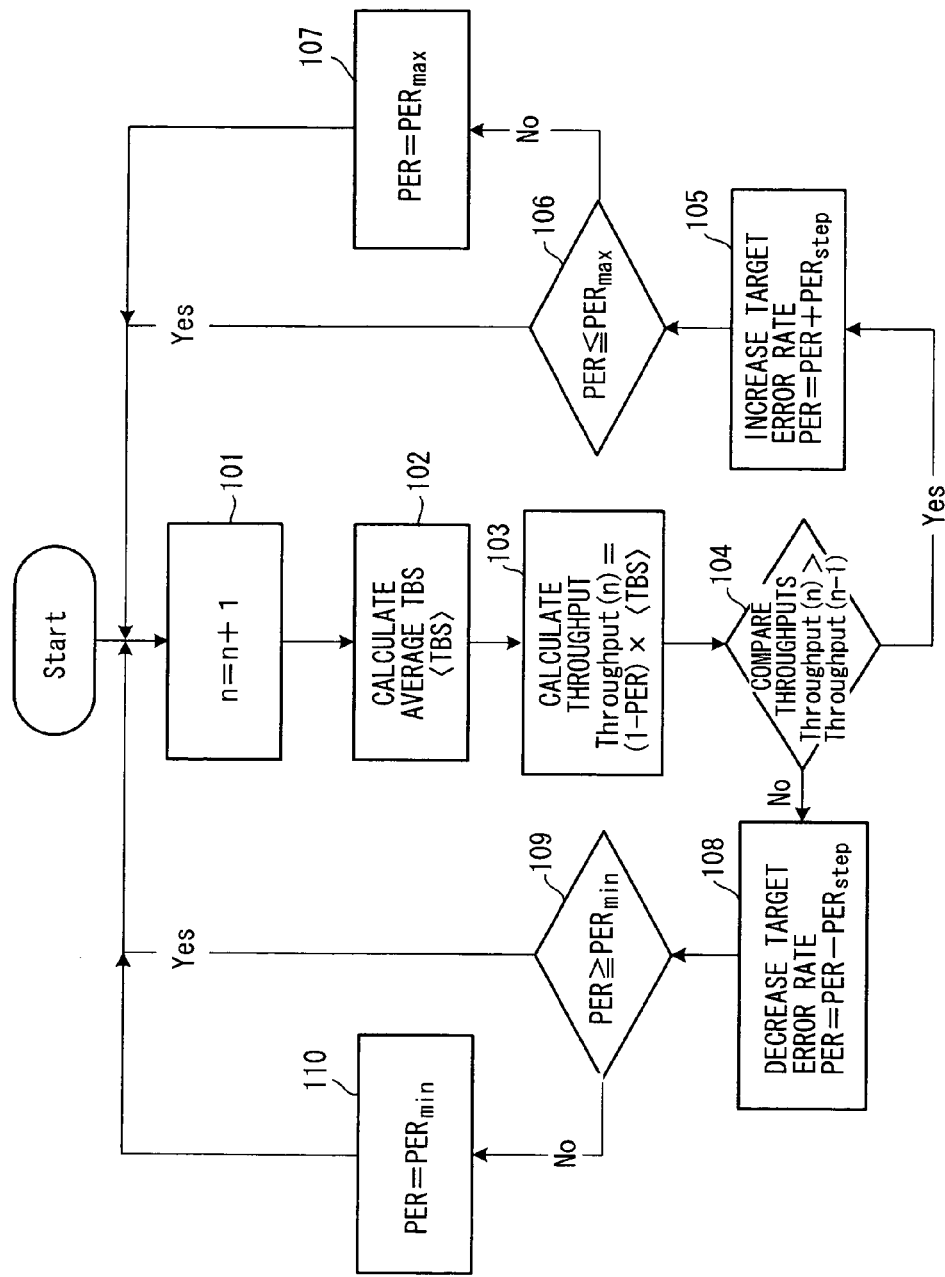
FIG. 8 is a flowchart illustrating control of target error rate using throughput.

FIG. 8 is a flowchart illustrating control of target error rate using throughput.

The throughput measurement/target error rate setting unit 51 increments n (n+1→n, where the initial value of n is 0; step 101), acquires from the MCS decision unit 23 the information data size TBS (Transport Block Size) of the transmitted data and calculates the average value <TBS> thereof (step 102).

Next, throughput (which here means an expected value of information data size capable of being received with one packet) is found by multiplying the average value of TBS by a value that is the result of subtracting the target error rate PER from 1, as indicated by the following equation (step 103):

$$\text{Throughput}=<\text{TBS}>(1-\text{PER}) \quad (9)$$

More specifically, the target error rate PER is held fixed, TBS is averaged over a fixed time to obtain throughput throughput (n), then the present throughput throughput(n) and the preceding throughput throughput(n−1) are compared in terms of size (step 104). It should be noted that it is assumed that throughput(0)=0 holds. If it is determined that throughput(n) >throughput(n−1) holds, then the target error rate PER is increased by PERstep (e.g., 0.1) in accordance with the following equation (step 105):

$$\text{PER}=\text{PER}+\text{PERstep}$$

Next, it is determined whether PER has attained the maximum value (=PERmax) (step 106) and processing from step 101 onward is executed if the maximum value has not been reached. If the maximum value has been attained, on the other hand, the limitation PER=PERmax is applied (step 107), after which processing from step 101 onward is executed. Thus, if throughput rises, PER is enlarged so as to lower throughput.

If throughput(n)≦throughput(n−1) is found to hold at step 104, then the target error rate PER is reduced by PERstep (e.g., 0.1) in accordance with the following equation (step 108):

$$\text{PER}=\text{PER}-\text{PERstep}$$

Next, it is determined whether PER has attained a minimum value (=PERmin) (step 109) and processing from step 101 onward is executed if the minimum value has not been attained. If the minimum value has been attained, on the other hand, the limitation PER=PERmin is applied (step 110), after which processing from step 101 onward is executed. Thus, if throughput falls, PER is reduced so as to raise throughput.

In accordance with the fourth embodiment, TBS is averaged over fixed time intervals to find throughput, this throughput is compared with the immediately preceding throughput, the target PER is incremented by one step if throughput has risen and is decremented by one step if throughput has fallen. As a result, the PER varies between the maximum value (PERmax) and minimum value (PERmin). By repeating this, the target error rate can be made to converge to an area in which throughput is maximized.

(F) Fifth Embodiment

Figure 9:
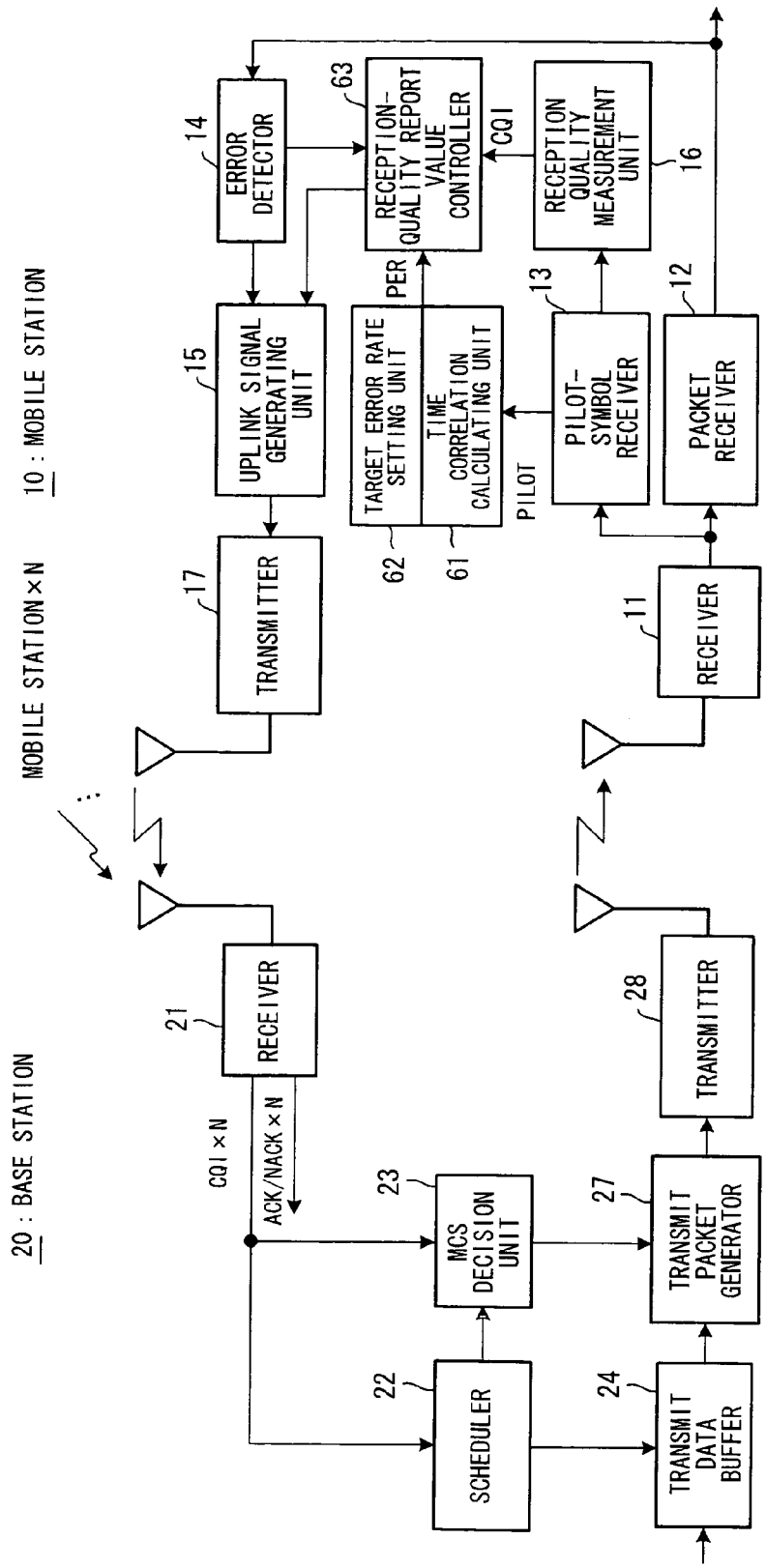
FIG. 9 is a block diagram illustrating the configuration of a radio packet communication system according to a fifth embodiment of the present invention.

FIG. 9 is a block diagram illustrating the configuration of a radio packet communication system according to a fifth embodiment of the present invention, in which components identical with those of the second embodiment are designated by like reference characters. This embodiment differs in that (1) the time correlation characteristic is calculated by the mobile station 10; (2) the target error rate PER is decided adaptively based upon this time correlation characteristic; (3) the radio downlink quality information CQI is corrected based upon this target error rate PER and the result of error detection; and (4) the quality information CQI is transmitted to the base station 20 and the latter decides the transport block size TBS, the modulation scheme (QPSK/16-QAM) and the transmit-code bit count n or the encoding rate r based upon the quality information CQI.

A time correlation calculating unit 61 calculates the time correlation value $R_2$ of downlink reception quality in accordance with Equation (6) using the downlink pilot symbol and inputs $R_2$ to a target error rate setting unit 62.

The target error rate setting unit 62, which has a correspondence table indicating the correspondence between the time correlation value $R_2$ and target error rate PER, decides the calculated target error rate PER that corresponds to the time correlation value $R_2$ using the table and inputs PER to a reception-quality report value controller 63. It should be noted that the target error rate setting unit 62 has a structure identical with that shown in FIG. 4.

The reception-quality report value controller 63 decides $\alpha$, $\beta$ based on the target error rate PER, calculates an offset in accordance with Equation (2) based upon the result of error detection and corrects CQI by adding the offset to the CQI output by the reception quality measurement unit 16. The uplink signal generating unit 15 incorporates ACK/NACK, which is the result of error detection, and the corrected reception quality information CQI in the uplink signal, and the transmitter 17 subjects the uplink signal to modulation processing and frequency conversion and transmits the resultant signal.

The receiver 21 of the base station 20 receives uplink signals from a plurality of the mobile stations 10, applies a frequency conversion and demodulation processing to the receive signal and then separates ACK/NACK and CQI from the signal and outputs the same. On the basis of the quality information CQI from each mobile station, the scheduler 22 of the base station selects the mobile station to which the next packet is to be transmitted and inputs this information to the MCS decision unit 23 and transmit-data buffer 24. The MCS decision unit 23 inputs the transport block size TBS, the modulation scheme (QPSK/16-QAM) and the transmit-code bit count n or the encoding rate r, which correspond to the CQI, from the CQI-MCS correspondence table to the transmit packet generator 27. The latter performs encoding based upon the encoding rate r (=TBS/n) and creates a downlink radio packet by performing digital modulation in accordance with the modulation scheme (QPSK/16-QAM), and the transmitter 28 transmits this radio packet and a known pilot, which enters from a pilot generator (not shown).

In accordance with the fifth embodiment, in a manner similar to that of the first embodiment, a variation-with-time characteristic of reception quality from the moment a mobile station measures reception quality to the moment a packet is actually received thereby is estimated, and the target error rate is changed over adaptively based upon the variation-with-time characteristic in such a manner that throughput is maximized. As a result, a decline in throughput can be prevented.

Further, the variation-with-time characteristic of downlink reception quality can be calculated accurately by a simple correlation calculation applied to a pilot symbol.

It should be noted that in a case where the CQI reporting period of a mobile station fluctuates, the time correlation value $R_2$ calculated in accordance with Equation (6) is converted to the fading frequency $f_D$, the reception quality variation coefficient $f_D'$ is obtained by multiplying the fading frequency $f_D$ by the average CQI delay time, and the target error rate PER is decided using a predetermined table. As a result, even if the CQI reporting period fluctuates for every mobile station, this fluctuation can be accommodated.

(G) Sixth Embodiment

Figure 10:
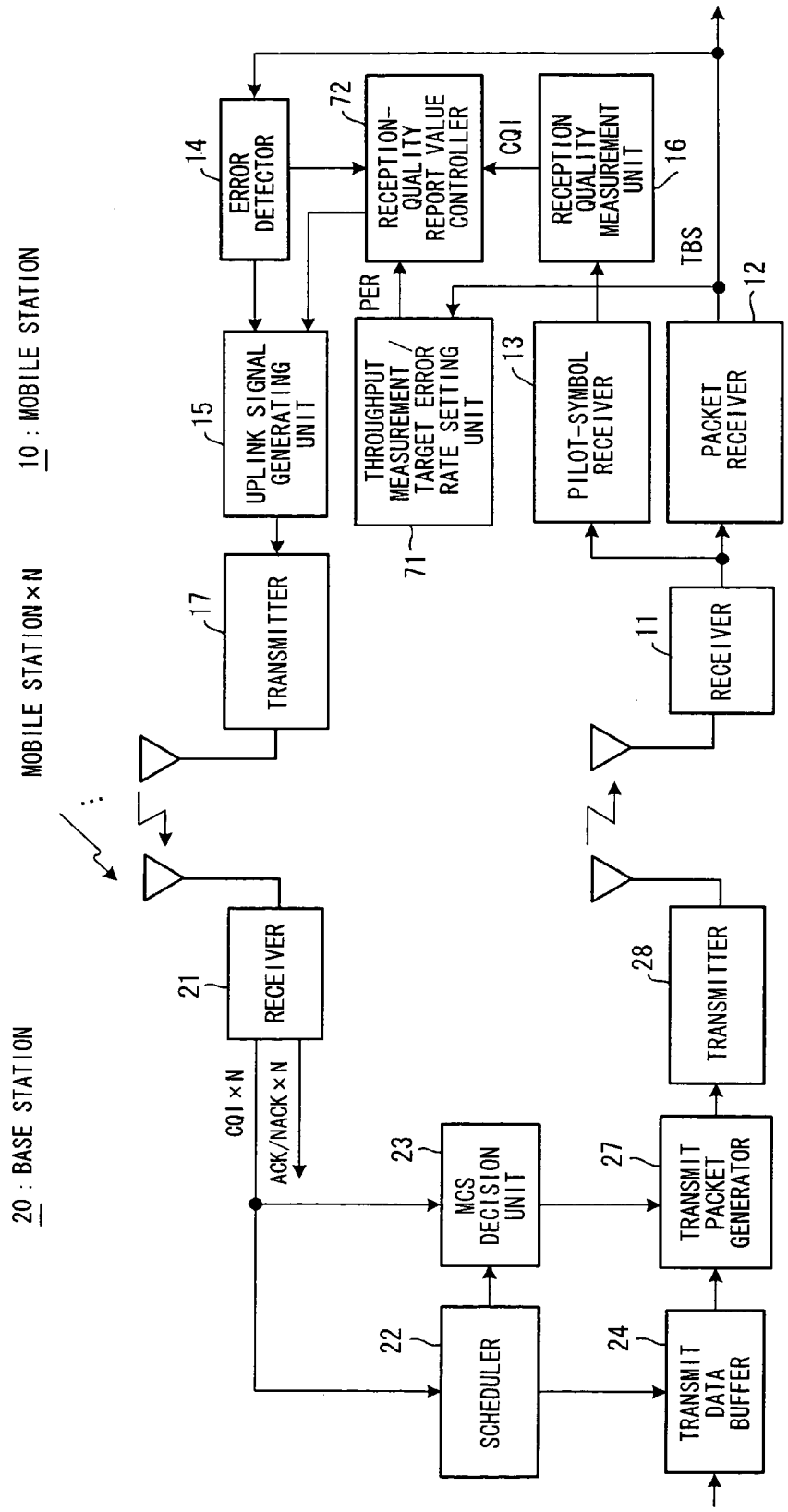
FIG. 10 is a block diagram illustrating the configuration of a radio packet communication system according to a sixth embodiment of the present invention.
Figure 11:
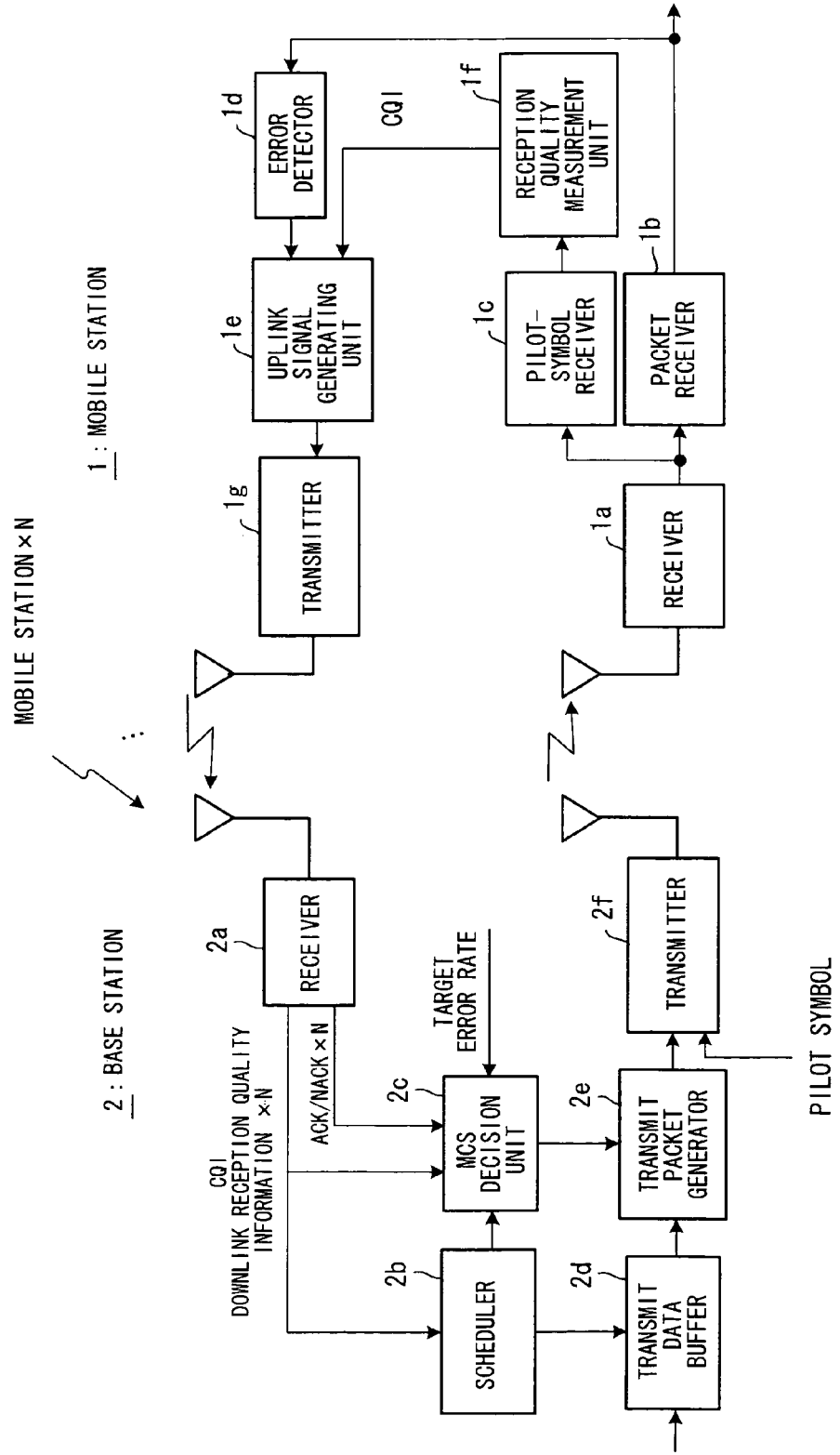
FIG. 11 is a block diagram illustrating the configuration of a radio packet communication system according to the prior art.
Figure 12:
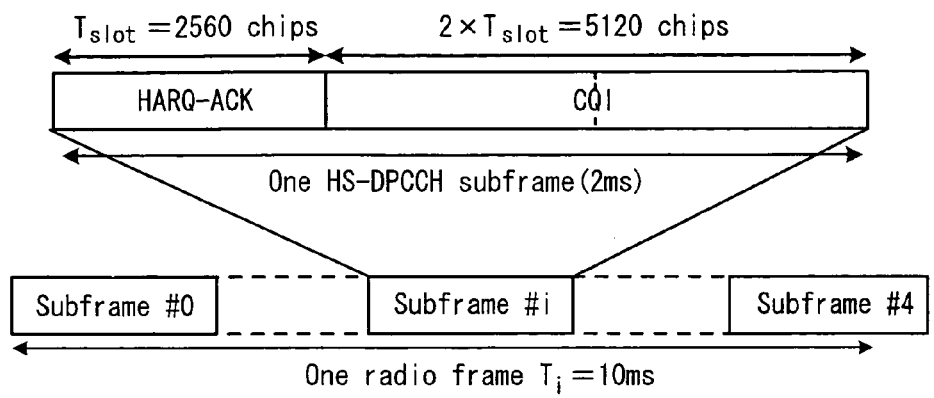
FIG. 12 illustrates an example of a data format for transmitting ACK/NACK and CQI on an uplink HS-DPCCH channel in 3GPP according to the prior art.

FIG. 10 is a block diagram illustrating the configuration of a radio packet communication system according to a sixth embodiment of the present invention, in which components identical with those of the fourth embodiment of FIG. 7 are designated by like reference characters. This embodiment differs in that (1) the mobile station 10 is provided with a throughput measurement/target error rate setting unit 71 for deciding the target error rate PER adaptively at the mobile station; (2) a reception-quality report value controller 72 corrects the radio downlink quality information CQI based upon the PER and the result of error detection; and (3) the quality information CQI is transmitted to the base station 20 and the latter decides the transport block size TBS, the modulation scheme (QPSK/16-QAM) and the transmit-code bit count n or the encoding rate r based upon the quality information CQI.

The throughput measurement/target error rate setting unit 71 obtains throughput by averaging TBS at fixed time intervals in accordance with the flowchart of FIG. 8, compares this throughput with the immediately preceding throughput, increments the target error rate PER by one step if throughput has risen, decrements the target error rate PER by one step if throughput has fallen and inputs the target error rate PER to the reception-quality report value controller 72.

The reception-quality report value controller 72 decides $\alpha$, $\beta$ based on the target error rate PER, calculates an offset in accordance with Equation (2) based upon the result of error detection and corrects CQI by adding the offset to the CQI output by the reception quality measurement unit 16. The uplink signal generating unit 15 incorporates ACK/NACK, which is the result of error detection, and the corrected reception quality information CQI in the uplink signal, and the transmitter 17 subjects the uplink signal to modulation processing and frequency conversion and transmits the resultant signal.

The receiver 21 of the base station 20 receives uplink signals from a plurality of the mobile stations 10, applies a frequency conversion and demodulation processing to the receive signal and then separates ACK/NACK and CQI from the signal and outputs the same. On the basis of the reception quality information CQI from each mobile station, the scheduler 22 of the base station selects the mobile station to which the next packet is to be transmitted and inputs this information to the MCS decision unit 23 and transmit-data buffer 24. The MCS decision unit 23 inputs the transport block size TBS, the modulation scheme (QPSK/16-QAM) and the transmit-code bit count n or the encoding rate r, which correspond to the CQI, from the CQI-MCS correspondence table to the transmit packet generator 27. The latter performs encoding based upon the encoding rate r (=TBS/n) and creates a downlink radio packet by performing digital modulation in accordance with the modulation scheme (QPSK/16-QAM), and the transmitter 28 transmits this radio packet and a known pilot, which enters from a pilot generator (not shown).

In accordance with the sixth embodiment, effects equivalent to those of the fourth embodiment can be obtained.

In the foregoing embodiments, there are portions that have been described taking into account a case where communication is performed according to a CDMA scheme. However, the present invention is not limited to CDMA communication and is applicable to various transmission schemes such as frequency multiplexing and time division multiplexing.

Further, in the foregoing embodiments, encoding rate and modulation scheme are controlled based upon reception quality information. However, it may be so arranged that one parameter only is controlled.

As many apparently widely different embodiments of the present invention can be made without departing from the spirit and scope thereof, it is to be understood that the invention is not limited to the specific embodiments thereof except as defined in the appended claims.

What is claimed is:

1. A radio communication apparatus in a radio packet communication system for feeding back radio link quality information, which has been measured on a packet receiving side, to a transmitting side and adaptively controlling a modulation scheme and/or encoding rate on the transmitting side using the quality information, comprising:
estimating means for estimating a variation-with-time characteristic of the radio link quality using the radio link quality information reported by the packet receiving side;
changeover means for adaptively changing over a target error rate using the variation-with-time characteristic;
deciding means for deciding a modulation scheme and/or encoding rate, in such a manner that packet error rate becomes equal to the target error rate, using the radio link quality information as well as reception success/failure information reported by the packet receiving side; and
means for transmitting a packet based upon the modulation scheme and/or encoding rate decided;
wherein said estimating means estimates the variation-with-time characteristic of the radio link quality by calculating correlation of the radio link quality at prescribed time intervals.

2. A radio communication apparatus in a radio packet communication system for feeding back radio link quality information, which has been measured on a packet receiving side, to a transmitting side and adaptively controlling a modulation scheme and/or encoding rate on the transmitting side using the quality information, comprising:
estimating means for estimating a variation-with-time characteristic of the radio link quality using a pilot symbol received from the packet receiving side;
changeover means for adaptively changing over a target error rate using the variation-with-time characteristic;
deciding means for deciding a modulation scheme and/or encoding rate, in such a manner that packet error rate becomes equal to the target error rate, using the radio link quality information as well as reception success/failure information reported by the packet receiving side; and
means for transmitting a packet based upon the modulation scheme and/or encoding rate decided;
wherein said estimating means estimates the variation-with-time characteristic of the radio link quality by calculating correlation of a receive pilot symbol at prescribed time intervals.

3. The apparatus according to claim 1, wherein said changeover means has a correspondence table indicating correspondence between the variation-with-time characteristic and the target error rate and changes over the target error rate adaptively based upon the variation-with-time characteristic using said table.

4. The apparatus according to claim 1, wherein said deciding means tabulates data related to modulation scheme and/or encoding rate in correspondence with the radio link quality information, corrects the radio link quality information by increasing or decreasing it based upon reception success/failure by an amount that conforms to the target error rate, and obtains data related to modulation scheme and/or encoding rate conforming to the radio link quality information after the correction thereof.

5. The apparatus according to claim 1, wherein said changeover means has means for controlling the target error rate based upon a period at which the radio link quality information is reported from the receiving side.

6. A radio communication apparatus in a radio packet communication system for feeding back radio link quality information, which has been measured on a packet receiving side, to a transmitting side and adaptively controlling a modulation scheme and/or encoding rate on the transmitting side using the quality information, comprising:
estimating means for estimating throughput on the packet receiving side;
control means for adaptively controlling a target error rate so as to maximize the throughput;
means for deciding a modulation scheme and/or encoding rate, in such a manner that average error rate of a packet becomes equal to the target error rate, using the radio link quality information as well as reception success/failure information reported by the packet receiving side; and
means for transmitting a packet based upon the modulation scheme and/or encoding rate decided,
wherein said estimating means estimates throughput THP in accordance with the following equation:

$$THP = <TBS> \times (1-PER)$$

where <TBS> represents the average value of transport block size and PER represents the target error rate.

7. The apparatus according to claim 6, wherein said control means increases the target error rate if present throughput is greater than immediately preceding throughput and decreases the target error rate if the present throughput is equal to or less than the immediately preceding throughput.

8. A radio communication apparatus in a radio packet communication system for feeding back radio link quality information, which has been measured on a packet receiving side, to a transmitting side and adaptively controlling a modulation scheme and/or encoding rate on the transmitting side using the quality information, comprising:

estimating means for estimating a variation-with-time characteristic of the radio link quality using a pilot symbol received from the packet transmitting side;

changeover means for adaptively changing over a target error rate using the variation-with-time characteristic;

means for receiving a radio packet, which has undergone error detection and encoding, and performing error detection;

means for measuring a radio link quality value using the pilot symbol received;

means for correcting the radio link quality value using result of the error detection in such a manner that packet error rate becomes equal to the target error rate; and means for reporting the corrected radio link quality value to a packet transmitting side as said radio link quality information;

wherein said estimating means estimates the variation-with-time characteristic of the radio link quality by calculating correlation of a receive pilot symbol at prescribed time intervals.

9. The apparatus according to claim 8, wherein said changeover means has a correspondence table indicating correspondence between the variation-with-time characteristic and the target error rate and changes over the target error rate adaptively using said table.

10. The apparatus according to claim 8, wherein said changeover means has means for controlling the target error rate based upon measurement period of the measured radio link quality value.

* * * * *